(12) United States Patent
Kahen et al.

(10) Patent No.: US 7,045,825 B2
(45) Date of Patent: May 16, 2006

(54) VERTICAL CAVITY LASER PRODUCING DIFFERENT COLOR LIGHT

(75) Inventors: Keith B. Kahen, Rochester, NY (US); Erica N. Montbach, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 21 days.

(21) Appl. No.: 10/857,512

(22) Filed: May 28, 2004

(65) Prior Publication Data

US 2005/0264715 A1  Dec. 1, 2005

(51) Int. Cl.
*H01L 21/00* (2006.01)
*H01L 33/00* (2006.01)
*H01S 3/03* (2006.01)
*H01S 3/09* (2006.01)

(52) U.S. Cl. .............. 257/88; 257/89; 372/39
(58) Field of Classification Search ......... 257/88–100; 372/39, 96
See application file for complete search history.

(56) References Cited

U.S. PATENT DOCUMENTS 6,853,660 B1 * 2/2005 Spoonhower et al. ......... 372/39

2004/0217364 A1 * 11/2004 Tarsa eta al. ............... 257/89

FOREIGN PATENT DOCUMENTS

| EP | 1 333 550 | 8/2003 |
|----|-----------|--------|
| EP | 1 359 752 | 11/2003 |
| EP | 1 365 490 | 11/2003 |

OTHER PUBLICATIONS

W. Crossland, SID Digest 837, (1997).

* cited by examiner

*Primary Examiner*—Cuong Nguyen
(74) *Attorney, Agent, or Firm*—Raymond L. Owens

(57) ABSTRACT

A display apparatus for producing colored pixelated light includes a backlight unit for producing pump-beam light and a vertical cavity laser array device including a structure for modulating the properties of the device at spaced locations so as to provide an array of spaced laser pixels which have higher net gain than the interpixel regions, and an active region which produces blue light in response to the pump-beam light. The apparatus also includes a light shutter and a color conversion layer including different portions, where selected different portions in response to blue light produce a different colored light and being adapted to increase the angular cone of view of the selected colored light.

68 Claims, 14 Drawing Sheets

VERTICAL CAVITY LASER PRODUCING DIFFERENT COLOR LIGHT

CROSS REFERENCE TO RELATED APPLICATIONS

Reference is made to commonly assigned U.S. patent application Ser. No. 10/864,100 filed simultaneously herewith by Keith B. Kahen, et al., entitled "Display Device Using Vertical Cavity Laser Arrays", the disclosure of which is herein incorporated by reference.

FIELD OF THE INVENTION

The present invention relates to a display device for producing colored light which uses a vertical cavity laser array.

BACKGROUND OF THE INVENTION

In order to facilitate reading of the specification, the following terms are defined. Optic axis herein refers to the direction in which propagating light does not see birefringence. Polarizer and analyzer herein refer to elements that polarize electromagnetic waves. However, the one closer to the source of the light will be called a polarizer, while the one closer to the viewer will be called an analyzer. Polarizing elements herein refers to both the polarizer and analyzer. Azimuthal angle $\phi$ and tilt angle $\theta$ are herein used to specify the direction of an optic axis. For the transmission axes of the polarizer and the analyzer, only the azimuthal angle $\phi$ is used, as their tilt angle $\theta$ is zero.

FIG. 1 shows the definition of the azimuthal angle $\phi$ and tilt angle $\theta$ to specify the direction of the optic axis 1 with respect to the x-y-z coordinate system 3. The x-y plane is parallel to the display surface 5, and the z-axis is parallel to the display normal direction 7. The azimuthal angle $\phi$ is the angle between the y-axis and the projection of the optic axis 9 onto the x-y plane. The tilt angle $\theta$ is the angle between the optic axis 1 and the x-y plane.

There are a number of ways of producing pixelated colored light for display applications, such as for example, using a conventional passive or active matrix organic light emitting diode (OLED) device. Another way is to employ a liquid crystal display (LCD). In typical LCD systems, a liquid crystal cell is placed between a pair of polarizers. Light that enters the display is polarized by the initial polarizer. As the light passes through the liquid crystal cell, the molecular orientation of the liquid crystal material affects the polarized light such that it either passes through the analyzer or it is blocked by the analyzer. The orientation of the liquid crystal molecules can be altered by applying a voltage across the cell, thus enabling varying amounts of light intensity to pass through the LCD pixels. By employing this principle, minimal energy is required to switch the LCD. This switching energy is typically much less than that required for cathode ray tubes (CRT) employing cathodoluminescent materials, making a display that utilizes liquid crystal materials very attractive.

The typical liquid crystal cell contains a color filter array (CFA) comprised of red, green, and blue transmitting pixels. To transmit a large portion of the light from the backlight unit (BLU), the transmission spectra of each of the CFA pixels must have a large full-width at half maximum (FWHM). As a result of the large FWHM, the color gamut of the LCD is, at best, approximately 0.7 of the NTSC color gamut standard. Additionally, as light impinges on the CFA, more then two-thirds of that light is absorbed by the CFA, permitting for less than one-third to be transmitted. Correspondingly, this absorption of light outside of each pixel's transmission spectra results in a loss of overall display efficiency.

A transmissive LCD is illuminated by a backlight unit, including a light source, light guide plate (LGP), reflector, diffuser, collimating films, and a reflective polarizer. The reflective polarizer is used to recycle and reflect light of the undesired polarization. However, not all of the light of the undesired polarization is recycled and not all of the recycled light exits the BLU with the correct polarization state. Therefore, only a small portion of light reflected from the reflective polarizer is recycled into the correct polarization state. As a result, an unpolarized BLU light source results in nearly a factor of two efficiency loss upon passing through the bottom polarizer.

LCDs are quickly replacing CRTs and other types of electronic displays for computer monitors, televisions, and other office and household displays. However, LCD's suffer from poor contrast ratios at larger viewing angles. Unless the contrast ratio is improved at large viewing angles, the penetration of LCDs into certain markets will be limited. The poor contrast ratio is typically due to increased brightness of the display's dark state. LCDs are optimized such that the display has the highest contrast ratio within a narrow viewing cone centered on axis (at zero degrees viewing angle). As the display is viewed off-axis at larger viewing angles, the dark state experiences an increase in brightness, thus decreasing the contrast ratio. When viewing full color displays off axis, not only does the dark state increase in brightness, but also there is a shift in color of both the dark and bright states. In the past there has been an attempt to improve this hue shift and loss of contrast ratio by various methods, such as the introduction of compensation films into the display or segmenting the pixel even further using multi-domains. However, these methods improve the hue shift and contrast ratio only slightly and for a limited viewing cone. Also, the manufacturing of compensation films and multi-domain liquid crystal cells is typically expensive, thus increasing the overall cost of the display.

Other flat panel displays try to solve the viewing angle problem by incorporating a photoluminescent (PL) screen on the front of the LCD, which is called a PL-LCD, as described in W. Crossland, SID Digest 837, (1997). This display employs a backlight unit of narrow band frequency, a liquid crystal modulator, and a photoluminescent output screen for producing color. The PL-LCD light source utilizes wavelengths that are in the UV, which would accelerate the breakdown of the liquid crystal materials. Also, the PL-LCD light source is much less efficient than the standard cold cathode fluorescent lamps (CCFLs) used in typical LCD displays.

In general, it would be beneficial to produce a display that did not suffer from the problems associated with typical LCD displays. As discussed above, these drawbacks are loss of efficiency (due to unpolarized backlights and usage of CFA's), poor color gamut, and loss of contrast and color at larger viewing angles. OLED displays overcome some of these disadvantages, however, they currently suffer from short lifetimes and higher manufacturing costs. Part of the higher manufacturing cost is inherent in the OLED design, such as the need to pixelate the OLED emitter region and the greater complexity of thin film transistors (TFTs) for current driven devices.

SUMMARY OF THE INVENTION

It is therefore an object of the present invention to provide a display that overcomes the disadvantages inherent in typical LCD displays, such as loss of efficiency, poorer color gamut, and lower contrast and color at larger viewing angles.

This object is achieved by a display apparatus for producing colored pixelated light, comprising:
a) a backlight unit for producing pump-beam light;
b) a vertical cavity laser array device including:
  i) a structure for modulating the properties of the device at spaced locations so as to provide an array of spaced laser pixels which have higher net gain than the interpixel regions; and
  ii) an active region which produces blue light in response to the pump-beam light;
c) a light shutter; and
d) a color conversion layer including different portions where selected different portions in response to blue light produce a different colored light and being adapted to increase the angular cone of view of the selected colored light.

ADVANTAGES

It is an advantage of the present invention to use a blue emitting, planar, large area, two-dimensional vertical cavity surface emitting laser (VCSEL) array as the light source for a liquid crystal display. Each blue colored element contains thousands of micron-sized laser pixels, which are mutually incoherent. This leads to each blue colored element producing multimode laser light. As a result of the pixel size being 3 to 5 microns in diameter, the divergence angle of the multimode laser light is on the order of 3–5°. This small divergence angle enables a 1:1 correspondence between the laser's blue colored elements and the pixels of the liquid crystal display. Correspondingly, it is no longer necessary to include the color filter array as one of the LCD film components.

In order to produce red and green light, a color converter layer is placed directly above the light switch. As such, the blue laser light is selectively absorbed by the converter, which down-converts the blue laser light into red and green light at the locations of the red and green display pixels.

An additional feature of the near collimation of the light source is that the liquid crystal viewing angle compensation films can be removed from the display structure. By including a birefringent layer as one of the VCSEL components, the multimode laser light output from the two-dimensional vertical cavity laser array can be polarized preferentially along one direction. As a result of the light source producing polarized light, the bottom polarizer element and its associated reflective polarizer element can be limited from the present LCD invention. It is also common to include collimating films as part of the LCD components; however, these films can be removed since the laser output from the two-dimensional vertical cavity laser array is naturally collimated (3–5° divergence angle).

An additional advantage of the present invention comes from the light output from each blue colored element being nearly single wavelength. This property permits the dark state of the liquid crystal display to be extremely efficient. Typically, a liquid crystal display's dark state is optimized at one wavelength with increasing light leakage at other wavelengths. The chromatic dark state contributes to loss of contrast ratio. Since only blue light is incident on the liquid crystal light shutter, the contrast ratio is not decreased due to chromatic losses.

DETAILED DESCRIPTION OF THE INVENTION

Figure 1:
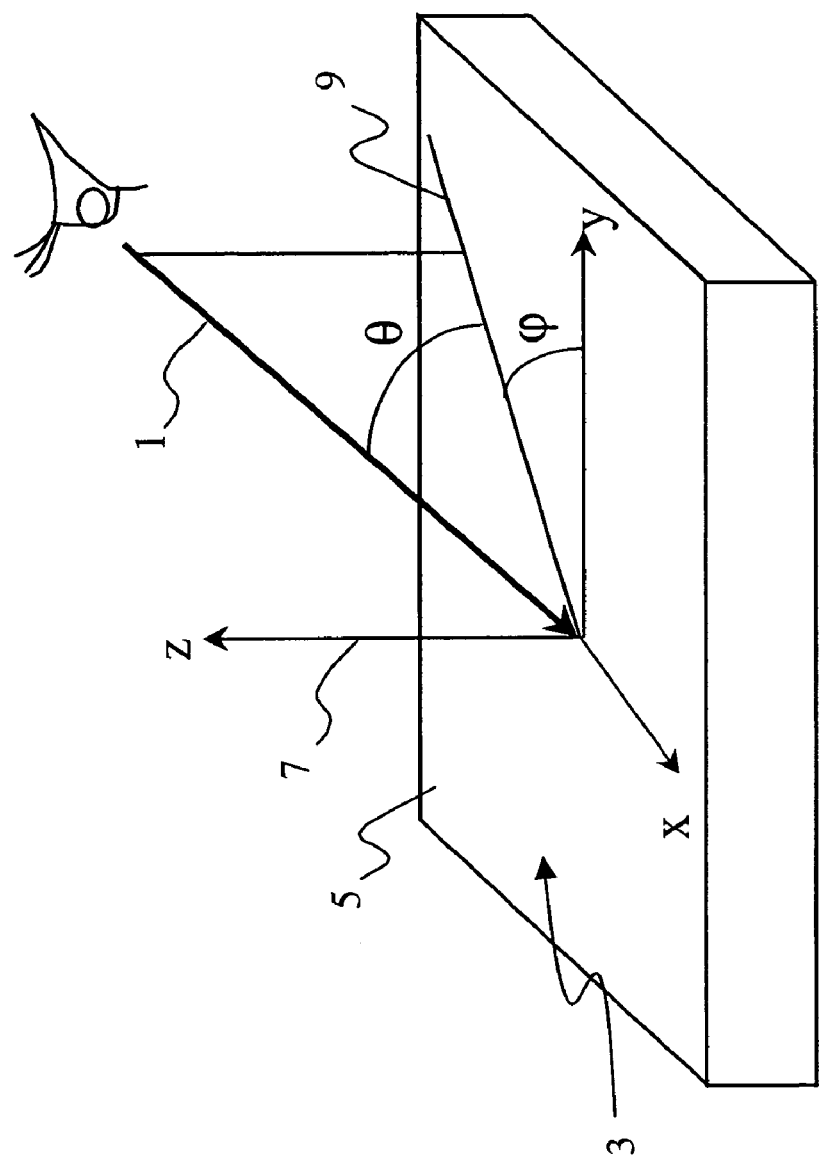
FIG. 1 shows a perspective which is useful in understanding the definition of the tilt and azimuthal angles to specify a direction of an optic axis.

The invention is enabled by a large planar light source that produces blue light which is nearly collimated and single wavelength. A light source that meets these criteria is a two-dimensional vertical cavity surface emitting laser (VCSEL) array device 100, as shown schematically in FIG. 2. FIG. 3 shows a top view of the two-dimensional VCSEL array device 100 where on the surface of the VCSEL needs to be defined blue emitting elements 205 which are composed of thousands of micron-sized laser pixels 200 separated by interpixel regions 210. In order to obtain large area blue laser light emission, it is preferred that an active region 130 be composed of organic-based gain media. However, recent research, R. N. Bhargava, Phys. Stat. Sol. 229, 897 (2002), points to the possibility of obtaining visible wavelength emission from inorganic-based nanoparticles. Examples of these are ZnO nanoparticles (with preferred diameters less than 10 nm) either undoped or doped with impurities, such as $Mn^{2+}$ or $Eu^{2+}$.

If single mode lasing action were desired from each blue emitting element 205, then the emission from the various laser pixels 200 needs to be phase-locked, i.e., intensity and phase information must be exchanged amongst the pixels (E. Kapon and M. Orenstein, U.S. Pat. No. 5,086,430). In addition, the laser pixels 200 need to be the same size and positioned in a periodic array. However, having single mode laser output from each emitting element 205 would result in speckle, which is not desirable for display applications. As a result, it is preferred that the individual laser pixels 200 be incoherent amongst themselves so as to result in multimode laser output from each emitting element 205. Even though the laser pixels 200 do not exchange intensity and phase information between themselves, in order to obtain nearly collimated and single wavelength output from each emitting element 205, each laser pixel needs to produce single mode output. As a result, the preferred diameter of the laser pixels 200 is in the range of 2.5 to 4.5 µm, where smaller diameters result in increased scattering loss and larger diameters result in unwanted higher-order transverse modes.

The present invention provides a way of modulating the net gain of the two-dimensional array of laser pixels. This modulation of the net gain can be obtained by a number of ways, such as selectively spoiling the emissive properties of the gain media in the active region 130, selectively pumping the gain media in the active region 130, and selectively etching one of the dielectric mirrors (stacks). A straightforward way to spoil the emissive properties of an organic-based gain media is to expose the organic based gain media to high levels of UV radiation. In order to selectively pump the gain media in the active region 130, an absorbing layer can be selectively deposited below the active region 130 (in the area underneath the interpixel regions 210) such that the absorbing layer absorbs a pump-beam light 180 prior to the light entering the active region 130. In both cases, the interpixel regions 210 are defined by where the net gain is lowered (through either spoiling the emissive properties or by absorbing the pump-beam light 180), while the two-dimensional array of laser pixels 200 corresponds to the regions where the net gain is unmodified. For the case of selectively etching one of the dielectric stacks, the modulation is obtained by performing a two-dimensional etch of one of the dielectric stacks, such that, the interpixel regions 210 correspond to the etched areas (lower overall reflectance at the lasing wavelength) of the dielectric stack, whereas the unetched areas (higher overall reflectance at the lasing wavelength) correspond to the laser pixels 200. For proper device operation, it is sufficient to etch either one or two periods of the dielectric stack. For the case of an organic-based gain media in the active region 130, all device processing must be performed prior to depositing the organic components, since it is very difficult to perform micron-scale patterning on the laser structure once the organic layers have been deposited. As a result, the etching is performed on a bottom dielectric stack 120. Even though weak confinement of the laser emission to the laser pixels 200 via net gain modulation can lead to phase-locked single mode lasing action in the best case, if phase-locking is only localized or if higher-order array modes are prevalent, then multimode lasing action will occur. In the present invention, multimode lasing action is preferred in order to prevent laser speckle. In such a case, in order to spoil even localized phase-locking, the size of the laser pixels 200 can be randomly varied from site to site, as well as placing the pixels on a randomly-arranged two-dimensional array.

Referring back to FIG. 2, the substrate 110 should be light transmissive. As a result, the substrate 110 can be transparent glass or plastic. On the substrate 110 is deposited the bottom dielectric stack 120, which is composed of alternating high and low refractive index dielectric materials. In general, the bottom dielectric stack 120 is designed to be reflective to laser light over a predetermined range of wavelengths. Typical high and low refractive index materials are $TiO_2$ and $SiO_2$, respectively. The bottom dielectric stack 120 can be deposited by plasma-enhanced chemical vapor deposition, electron-beam (e-beam) deposition, or sputtering. Additional methodologies are polymeric extrusion, and sol-gel and colloidal depositions, as commonly practiced in the art.

As is well known in the art, the light output from VCSEL devices typically does not have a preferred orientation and can vary as a function of light intensity. Ways for fixing the polarization can be broken into two groups: 1) have the oscillator strength of the lasing transition be different for the transverse electric (TE) and transverse magnetic (TM) polarizations; and 2) have the dielectric stack reflectance be different for the two polarizations. The first approach is difficult to implement for gain media comprised of amorphous organic compounds. As a result, in one of the preferred embodiments the reflectance of either the top or bottom dielectric stacks is modified in order to make it birefringent. It has been shown for inorganic VCSEL devices that a 4% difference in the threshold modal gains between the TE and TM polarizations will result in greater than a 100:1 polarization mode suppression ratio (PMSR), Y. Ju, et al., Appl. Phys. Lett. 71, 741 (1997). The simplest route to enable this modal difference for amorphous organic laser systems is to replace one of the layers of the dielectric stack (preferably the stack with the lower peak reflectance) with a birefringent layer 126. As is well known in the art, these birefringent layers can have the index of refraction in the two polarization directions differing by as much as 0.25, with a 0.16 index difference being more common. It is simple to calculate using standard transfer matrix techniques that the modal difference between the two polarizations will be on the order of 22% if one of the stack layers (whose peak reflectance is on the order of 99%) is replaced by the birefringent layer 126, for which the index difference is 0.16. Since this modal difference is far greater than the one measured by Y. Ju, et al., Appl. Phys. Lett. 71, 741 (1997) for inorganic VCSELs, then the resulting PMSR should be much larger than 100:1. Even though the VCSEL array device 100 is described with reference to including a birefringent layer 126 in order to polarize the laser light 190, as is well known in the art, Y. Ju, et al., Appl. Phys. Lett. 71, 741 (1997), other ways can be employed to polarize the light emission 190 from the VCSEL array device 100.

Figure 2:
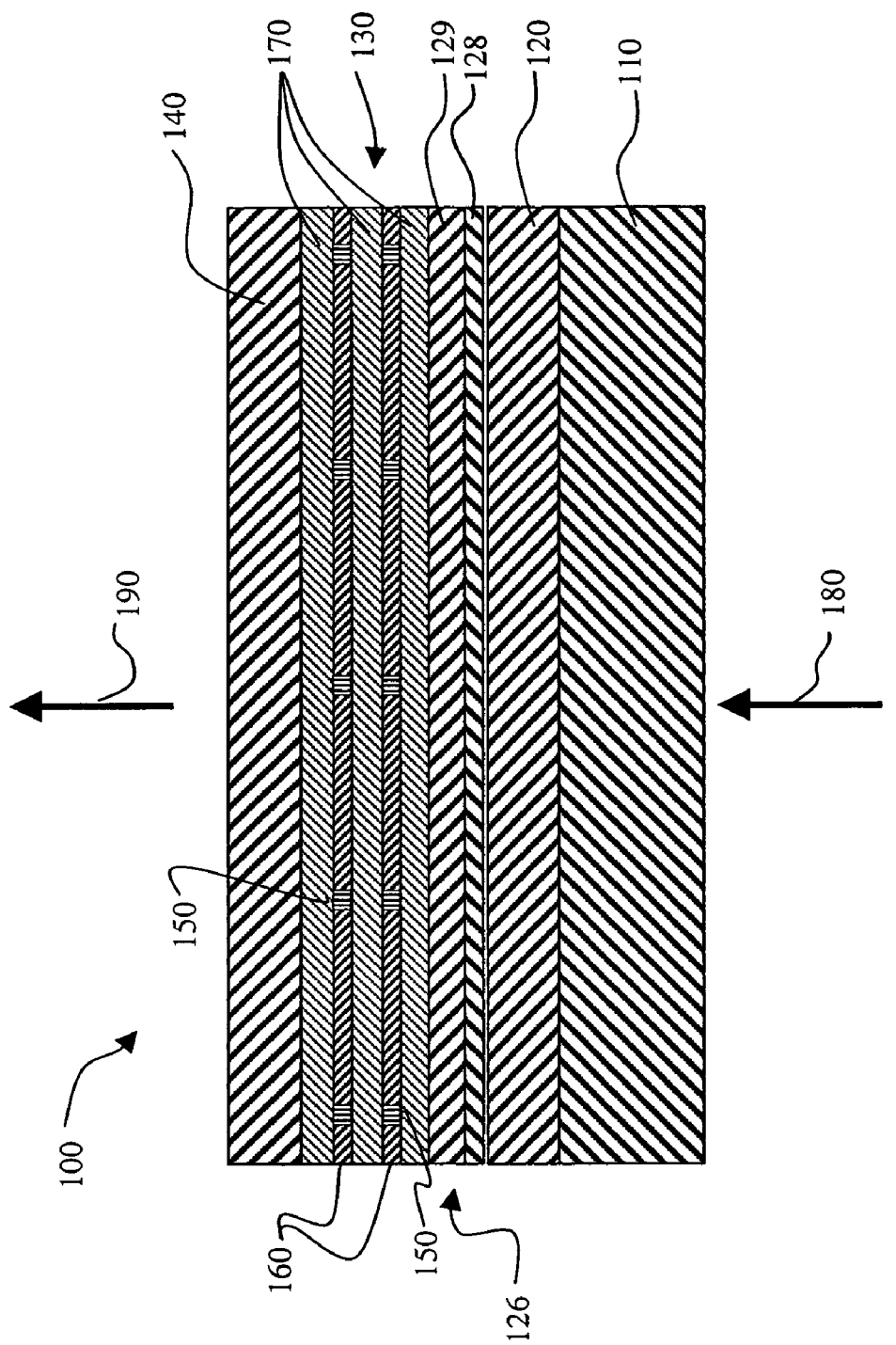
FIG. 2 shows a side cross sectional schematic of an optically pumped two-dimensional VCSEL array light source.
Figure 3:
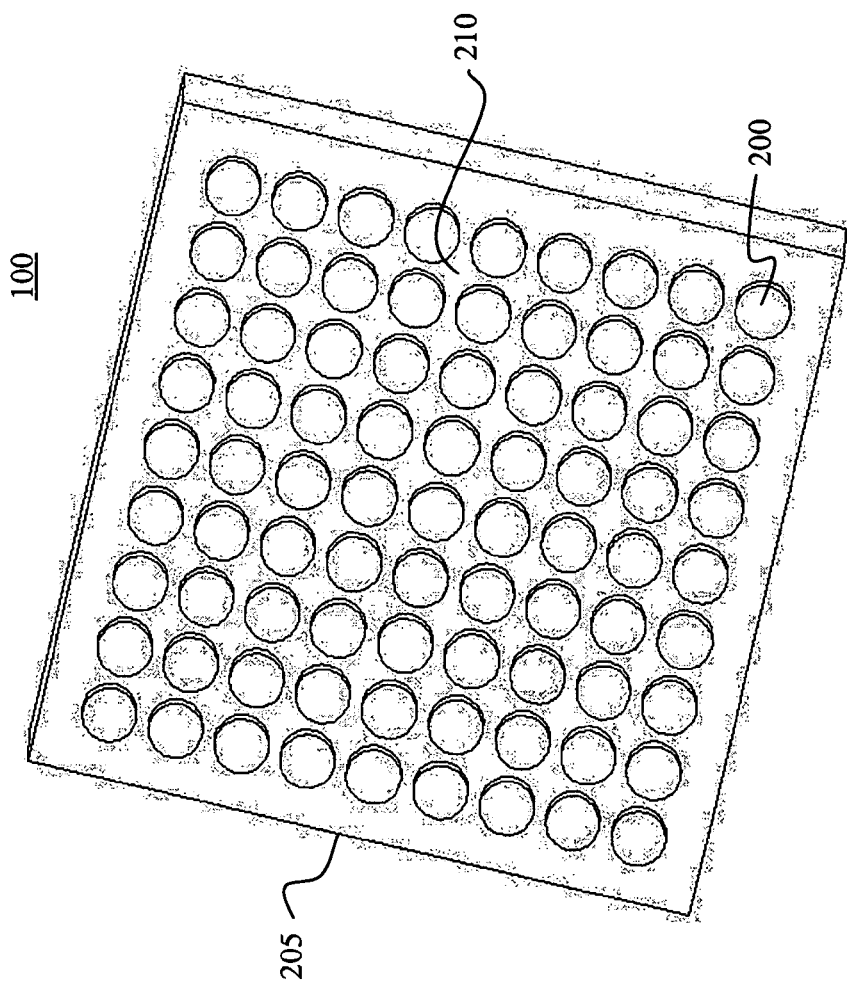
FIG. 3 shows a top view of a two-dimensional VCSEL array light source containing a blue emitting element in which the element is composed of thousands of micron-sized laser pixels.

The birefringent layer 126, shown in FIG. 2, includes an alignment layer 128 and a birefringent material 129, and is deposited over the bottom dielectric stack 120. The birefringent layer 126 can also be disposed between the active region 130 and a top dielectric stack 140. The birefringent layer 126 can also be disposed within one of the dielectric stacks.

The alignment layer 128 can be oriented by the following techniques. The alignment layer contains a photo-orientable or photo-alignable material and can be oriented by a photo-alignment technique. Photo-orientable materials include, for example, photo-isomerization polymers, photo-dimerization polymers, and photo-decomposition polymers. In a preferred embodiment, the photo-orientable materials are cinnamic acid derivatives as disclosed in U.S. Pat. No. 6,160, 597. Such materials can be oriented and simultaneously crosslinked by irradiation with linearly polarized UV light. The alignment layer can also be oriented by mechanical rubbing, which is well known in the art. The photo-alignment process can be accomplished by using an apparatus as described in commonly assigned U.S. Patent Application Publication 2004/0008310 A1, the disclosure of which is herein incorporated by reference.

The birefringent material 129 is typically a liquid crystalline monomer when the birefringent material 129 is first disposed on the alignment layer 128, and is crosslinked by UV irradiation, or polymerized by other ways such as heat. The birefringent material 129 can be a positive dielectric material, whose optic axis 1 has an average tilt angle between 0° and 20°. The birefringent material 129 can also be a negative dielectric material, whose optic axis 1 has an average tilt angle between 0° and 20°. In a preferred embodiment, the birefringent material 129 is comprised of diacrylate or diepoxide with positive birefringence as disclosed in U.S. Pat. No. 6,160,597 (Schadt, et al.) and U.S. Pat. No. 5,602,661 (Schadt, et al.). The optic axis 1 in the birefringent material 129 is usually untilted relative to the layer plane, and is uniform across the thickness direction.

The active region 130 is deposited over the bottom dielectric stack 120 or birefringent layer 126, when it is included in the device. FIG. 2 shows that the active region 130 is not a bulk layer but a multilayer composite. The active region 130 contains one or more periodic gain regions 160, which are separated by spacer layers 170. The thickness of the periodic gain regions 160 is typically less than 50 nm, with a preferred thickness of 5 to 30 nm. The thicknesses of the spacer layers 170 are chosen such that the periodic gain region(s) is aligned with the antinodes of the laser cavity's standing electromagnetic field (e-field). Employing periodic gain region(s) 160 in the active region 130 results in larger power conversion efficiencies and a large reduction in the unwanted spontaneous emission. In summary, the active region 130 includes one or more periodic gain regions 160 and spacer layers 170 disposed on either side of the periodic gain region(s) and arranged so that the periodic gain region(s) is aligned with the antinodes of the device's standing wave electromagnetic field.

The periodic gain region(s) 160 is composed of either small-molecular weight organic material, polymeric organic material, or inorganic-based nanoparticles, which fluoresce in the blue spectral region with a high quantum efficiency. The small-molecular weight organic material is typically deposited by high-vacuum ($10^{-6}$ Torr) thermal evaporation, while the conjugated polymers and inorganic nanoparticles are usually formed by spin casting.

Unless otherwise specifically stated, use of the term "substituted" or "substituent" means any group or atom other than hydrogen. Additionally, when the term "group" is used, it is meant that when a substituent group contains a substitutable hydrogen, it is also intended to encompass not only the substituent's unsubstituted form, but also its form further substituted with any substituent group or groups as herein mentioned, so long as the substituent does not destroy properties necessary for device utility. Suitably, a substituent group can be halogen or can be bonded to the remainder of the molecule by an atom of carbon, silicon, oxygen, nitrogen, phosphorous, sulfur, selenium, or boron. The substituent can be, for example, halogen, such as chloro, bromo or fluoro; nitro; hydroxyl; cyano; carboxyl; or groups which can be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2, 4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2, 4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]-sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy) acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which can be substituted and which contain a 3 to 7 membered heterocyclic ring composed of carbon atoms and at least one hetero atom selected from the group including oxygen, nitrogen, sulfur, phosphorous, or boron. such as 2-furyl, 2-thienyl, 2-benzimidazolyloxy or 2-benzothiazolyl; quaternary ammonium, such as triethylammonium; quaternary phosphonium, such as triphenylphosphonium; and silyloxy, such as trimethylsilyloxy.

If desired, the substituents can themselves be further substituted one or more times with the described substituent groups. The particular substituents used can be selected by those skilled in the art to attain the desired properties for a specific application and can include, for example, electron-withdrawing groups, electron-donating groups, and steric groups. When a molecule can have two or more substituents, the substituents can be joined together to form a ring such as a fused ring unless otherwise provided. Generally, the above groups and substituents thereof can include those having up to 48 carbon atoms, typically 1 to 36 carbon atoms and usually less than 24 carbon atoms, but greater numbers are possible depending on the particular substituents selected. Substitution can include fused ring derivatives such as, but not limited to benzo-, dibenzo-, naphtha-, or dinaphtho-fused derivatives. These fused ring derivatives can be further substituted as well.

The organic-based periodic gain region(s) 160 (or emissive material) can be comprised of a single host material, but more commonly includes a host material doped with a guest compound (dopant) or compounds where light emission comes primarily from the dopant and can be of any color. These host-dopant combinations are advantageous since they result in very small unpumped scattering/absorption losses for organic-based gain media (can be less than 1 $cm^{-1}$). The dopant is usually chosen from highly fluorescent dyes, but phosphorescent compounds, e.g., transition metal complexes as described for OLED applications in WO 98/55561, WO 00/18851, WO 00/57676, and WO 00/70655 are also useful. Dopants are typically coated as 0.01 to 10% by weight into the host material, wherein they can be selected to provide emitted light having hues of either red, green, or blue. An example of a useful host-dopant combination for red emitting layers is Alq as the host material and 1% L39 [4-(dicyanomethylene)-2-t-butyl-6-(1,1,7,7-tetramethyljulolidyl-9-enyl)-4H-pyran] as the dopant.

An important relationship for choosing a dye as a dopant is a comparison of the absorption of the dopant material and emission of the host material. For efficient energy transfer (via Forster energy transfer) from the host to the dopant molecule, a necessary condition is that the absorption of the dopant overlaps the emission of the host material. Those skilled in the art are familiar with the concept of Forster energy transfer, which involves a radiationless transfer of energy between the host and dopant molecules. An important relationship for choosing the host material is that the absorption of the host material significantly overlaps the emission spectrum of the pump-beam 180 light. In addition it is preferred that the absorption of the host material or a host material plus a dopant is small at the laser emission wavelength of the VCSEL array device 100. An acceptable level of absorption is that the absorption coefficient of the host plus dopant combination is less than 10 $cm^{-1}$ at the wavelength of the laser emission.

Useful fluorescent emissive materials includes polycyclic aromatic compounds as described in I. B. Berlman, "Handbook of Fluorescence Spectra of Aromatic Molecules," Academic Press, New York, 1971 and EP 1 009 041. Tertiary aromatic amines with more than two amine groups can be used including oligomeric materials.

Another class of useful emissive materials (for host or dopants) include aromatic tertiary amines, where the latter is understood to be a compound containing at least one trivalent nitrogen atom that is bonded only to carbon atoms, at least one of which is a member of an aromatic ring. In one form the aromatic tertiary amine can be an arylamine, such as a monoarylamine, diarylamine, triarylamine, or an oligomeric arylamine. Exemplary monomeric triarylamines are illustrated by Klupfel et al. U.S. Pat. No. 3,180,730. Other suitable triarylamines substituted with one or more vinyl radicals and/or comprising at least one active hydrogen containing group are disclosed by Brantley et al. U.S. Pat. Nos. 3,567,450 and 3,658,520.

A more preferred class of aromatic tertiary amines are those which include at least two aromatic tertiary amine moieties as described in U.S. Pat. Nos. 4,720,432 and 5,061,569. Such compounds include those represented by structural Formula A

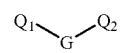

A wherein:

$Q_1$ and $Q_2$ are independently selected aromatic tertiary amine moieties; and G is a linking group such as an arylene, cycloalkylene, or alkylene group of a carbon to carbon bond.

In one embodiment, at least one of $Q_1$ or $Q_2$ contains a polycyclic fused ring structure, e.g., a naphthalene. When G is an aryl group, it is conveniently a phenylene, biphenylene, or naphthalene moiety.

A useful class of triarylamines satisfying structural Formula A and containing two triarylamine moieties is represented by structural Formula B

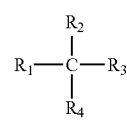

B where:

$R_1$ and $R_2$ each independently represent a hydrogen atom, an aryl group, or an alkyl group or $R_1$ and $R_2$ together represent the atoms completing a cycloalkyl group; and $R_3$ and $R_4$ each independently represent an aryl group, which is in turn substituted with a diaryl substituted amino group, as indicated by structural Formula C

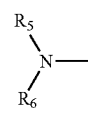

C wherein $R_5$ and $R_6$ are independently selected aryl groups. In one embodiment, at least one of $R_5$ or $R_6$ contains a polycyclic fused ring structure, e.g., a naphthalene.

The host material can comprise a substituted or unsubstituted triarylamine compound. Another class of aromatic tertiary amines are the tetraaryldiamines. Desirable tetraaryldiamines include two diarylamino groups, such as indicated by Formula C, linked through an arylene group. Useful tetraaryldiamines include those represented by Formula D

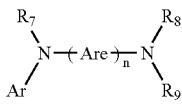

D wherein:
each Are is an independently selected arylene group, such as a phenylene or anthracene moiety;
n is an integer of from 1 to 4; and
Ar, $R_7$, $R_8$, and $R_9$ are independently selected aryl groups.

In a typical embodiment, at least one of Ar, $R_7$, $R_8$, and $R_9$ is a polycyclic fused ring structure, e.g., a naphthalene.

The various alkyl, alkylene, aryl, and arylene moieties of the foregoing structural Formulae A, B, C, D, can each in turn be substituted. Typical substituents include alkyl groups, alkoxy groups, aryl groups, aryloxy groups, and halogens such as fluoride, chloride, and bromide. The various alkyl and alkylene moieties typically contain from 1 to about 6 carbon atoms. The cycloalkyl moieties can contain from 3 to about 10 carbon atoms, but typically contain five, six, or seven carbon atoms—e.g., cyclopentyl, cyclohexyl, and cycloheptyl ring structures. The aryl and arylene moieties are usually phenyl and phenylene moieties.

The emissive material can be formed of a single or a mixture of aromatic tertiary amine compounds. Specifically, one can employ a triarylamine, such as a triarylamine satisfying the Formula B, in combination with a tetraaryldiamine, such as indicated by Formula D. The host material can include a substituted or unsubstituted dicarbazole-biphenyl compound. Illustrative of useful aromatic tertiary amines is the following:

1,1-Bis(4-di-p-tolylaminophenyl)cyclohexane;
1,1-Bis(4-di-p-tolylaminophenyl)-4-phenylcyclohexane;
N,N,N',N'-tetraphenyl-4,4'''-diamino-1,1':4',1'':4'',1'''-quaterphenyl;
Bis(4-dimethylamino-2-methylphenyl)phenylmethane;
1,4-bis[2-[4-[N,N-di(p-toly)amino]phenyl]vinyl]benzene (BDTAPVB);
N,N,N',N'-Tetra-p-tolyl-4,4'-diaminobiphenyl;
N,N,N',N'-Tetraphenyl-4,4'-diaminobiphenyl;
N,N,N',N'-tetra-1-naphthyl-4,4'-diaminobiphenyl;
N,N,N',N'-tetra-2-naphthyl-4,4'-diaminobiphenyl;
N-Phenylcarbazole;
4,4'-Bis[N-(1-naphthyl)-N-phenylamino]biphenyl (NPB);
4,4'-Bis[N-(1-naphthyl)-N-(2-naphthyl)amino]biphenyl (TNB);
4,4'-Bis[N-(1-naphthyl)-N-phenylamino]p-terphenyl;
4,4'-Bis[N-(2-naphthyl)-N-phenylamino]biphenyl;
4,4'-Bis[N-(3-acenaphthenyl)-N-phenylamino]biphenyl;
1,5-Bis[N-(1-naphthyl)-N-phenylamino]naphthalene;
4,4'-Bis[N-(9-anthryl)-N-phenylamino]biphenyl;
4,4'-Bis[N-(1-anthryl)-N-phenylamino]-p-terphenyl;
4,4'-Bis[N-(2-phenanthryl)-N-phenylamino]biphenyl;
4,4'-Bis[N-(8-fluoranthenyl)-N-phenylamino]biphenyl
4,4'-Bis[N-(2-pyrenyl)-N-phenylamino]biphenyl;
4,4'-Bis[N-(2-naphthacenyl)-N-phenylamino]biphenyl;
4,4'-Bis[N-(2-perylenyl)-N-phenylamino]biphenyl;
4,4'-Bis[N-(1-coronenyl)-N-phenylamino]biphenyl;
2,6-Bis(di-p-tolylamino)naphthalene;
2,6-Bis[di-(1-naphthyl)amino]naphthalene;
2,6-Bis[N-(1-naphthyl)-N-(2-naphthyl)amino]naphthalene;
N,N,N',N'-Tetra(2-naphthyl)-4,4''-diamino-p-terphenyl;
4,4'-Bis{N-phenyl-N-[4-(1-naphthyl)-phenyl]amino}biphenyl;
2,6-Bis[N,N-di(2-naphthyl)amino]fluorene;
4,4',4''-tris[(3-methylphenyl)phenylamino]triphenylamine (MTDATA); and
4,4'-Bis[N-(3-methylphenyl)-N-phenylamino]biphenyl (TPD).

The host material can comprise a substituted or unsubstituted aza-aromatic compound. For example, the host material can comprise a substituted or unsubstituted acridine, quinoline, purine, phenazine, phenoxazine, or phenanthroline compound. Carbazole derivatives are useful hosts. Useful examples of phenanthroline materials include 2,9-dimethyl-4,7-diphenyl-1,10-phenanthroline and 4,7-diphenyl-1,10-phenanthroline.

Host and dopant molecules include, but are not limited to, those disclosed in U.S. Pat. Nos. 4,768,292; 5,141,671; 5,150,006; 5,151,629; 5,405,709; 5,484,922; 5,593,788; 5,645,948; 5,683,823; 5,755,999; 5,928,802; 5,935,720; 5,935,721; and 6,020,078.

Metal complexes of 8-hydroxyquinoline and similar derivatives (Formula E) constitute one class of useful host materials capable of supporting electroluminescence, and are particularly suitable for light emission of wavelengths longer than 500 nm, e.g., green, yellow, orange, and red

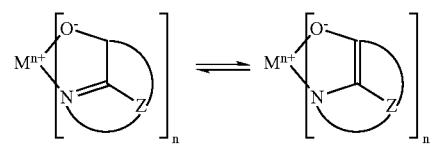

E wherein:
M represents a metal;
n is an integer of from 1 to 3; and
Z independently in each occurrence represents the atoms completing a nucleus having at least two fused aromatic rings.

From the foregoing it is apparent that the metal can be monovalent, divalent, trivalent, or tetravalent metal. The metal can, for example, be an alkali metal, such as lithium, sodium, or potassium; an alkaline earth metal, such as magnesium or calcium; an earth metal, such aluminum or gallium, or a transition metal such as zinc or zirconium. Generally any monovalent, divalent, trivalent, or tetravalent metal known to be a useful chelating metal can be employed.

Z completes a heterocyclic nucleus containing at least two fused aromatic rings, at least one of which is an azole or azine ring. Additional rings, including both aliphatic and aromatic rings, can be fused with the two required rings, if required. To avoid adding molecular bulk without improving on function the number of ring atoms is usually maintained at 18 or less.

The host material can comprise a substituted or unsubstituted chelated oxinoid compound.

Illustrative of useful chelated oxinoid compounds are the following:

CO-1: Aluminum trisoxine [alias, tris(8-quinolinolato)aluminum(III)];
CO-2: Magnesium bisoxine [alias, bis(8-quinolinolato)magnesium(II)];
CO-3: Bis[benzo{f}-8-quinolinolato]zinc (II);
CO-4: Bis(2-methyl-8-quinolinolato)aluminum(III)-μ-oxo-bis(2-methyl-8-quinolinolato) aluminum(III);
CO-5: Indium trisoxine [alias, tris(8-quinolinolato)indium];
CO-6: Aluminum tris(5-methyloxine) [alias, tris(5-methyl-8-quinolinolato) aluminum(III)];
CO-7: Lithium oxine [alias, (8-quinolinolato)lithium(I)];
CO-8: Gallium oxine [alias, tris(8-quinolinolato)gallium (III)]; and
CO-9: Zirconium oxine [alias, tetra(8-quinolinolato)zirconium(IV)].

The host material can include a substituted or unsubstituted anthracene compound.

Derivatives of 9,10-di-(2-naphthyl)anthracene (Formula F) constitute one class of useful hosts capable of supporting photoluminescence, and are particularly suitable for light emission of wavelengths longer than 400 nm, e.g., blue, green, yellow, orange or red

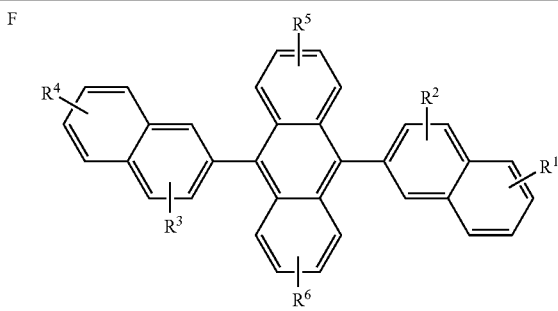

F wherein $R^1$, $R^2$, $R^3$, $R^4$, $R^5$, and $R^6$ represent one or more substituents on each ring where each substituent is individually selected from the following groups:

Group 1: hydrogen, or alkyl of from 1 to 24 carbon atoms;
Group 2: aryl or substituted aryl of from 5 to 20 carbon atoms;
Group 3: carbon atoms from 4 to 24 necessary to complete a fused aromatic ring of anthracenyl, pyrenyl, or perylenyl;
Group 4: heteroaryl or substituted heteroaryl of from 5 to 24 carbon atoms as necessary to complete a fused heteroaromatic ring of furyl, thienyl, pyridyl, quinolinyl or other heterocyclic systems;
Group 5: alkoxylamino, alkylamino, or arylamino of from 1 to 24 carbon atoms; and
Group 6: fluorine, chlorine, bromine or cyano.

Illustrative examples include 9,10-di-(2-naphthyl)anthracene (F1) and 2-t-butyl-9,10-di-(2-naphthyl)anthracene (F2). Other anthracene derivatives can be useful as a host, including derivatives of 9,10-bis-(4-(2,2'-diphenylethenyl) phenyl)anthracene.

Benzazole derivatives (Formula G) constitute another class of useful hosts capable of supporting photoluminescence, and are particularly suitable for light emission of wavelengths longer than 400 nm, e.g., blue, green, yellow, orange or red

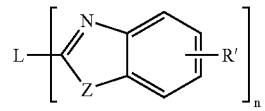

G where:
n is an integer of 3 to 8;
Z is O, NR or S; and
R and R' are individually hydrogen; alkyl of from 1 to 24 carbon atoms, for example, propyl, t-butyl, heptyl, and the like; aryl or hetero-atom substituted aryl of from 5 to 20 carbon atoms for example phenyl and naphthyl, furyl, thienyl, pyridyl, quinolinyl and other heterocyclic systems; or halo such as chloro, fluoro; or atoms necessary to complete a fused aromatic ring; and
L is a linkage unit including alkyl, aryl, substituted alkyl, or substituted aryl, which conjugately or unconjugately connects the multiple benzazoles together. An example of a useful benzazole is 2,2',2''-(1,3,5-phenylene)tris[1-phenyl-1H-benzimidazole].

The host material can comprise a substituted or unsubstituted benzoxazole compound, a substituted or unsubstituted benzothiazole compound, or a substituted or unsubstituted benzimidazole compound. The host material can comprise a substituted or unsubstituted oxazole compound, a substituted or unsubstituted triazole compound, or a substituted or unsubstituted oxadiazole compound. Useful examples of oxazole compounds include 1,4-bis(5-phenyloxazol-2-yl)benzene, 1,4-bis(4-methyl-5-phenyloxazol-2-yl)benzene, and 1,4-bis(5-(p-biphenyl)oxazol-2-yl)benzene. Useful examples of oxadiazole compounds include 2-(4-biphenylyl)-5-phenyl-1,3,4-oxadiazole and 2-(4-biphenylyl)-5-(4-tert-butylphenyl)-1,3,4-oxadiazole. Useful examples of triazole compounds include 3-(4-biphenylyl)-4-phenyl-5-tert-butylphenyl-1,2,4-triazole.

Distyrylarylene derivatives are also useful as host materials or dopant materials, many examples are described in U.S. Pat. No. 5,121,029. Useful emissive materials (hosts and dopants) can have the general Formulae

X—CH=CH—Y—CH=CH-Z

X—(CH=CH)$_n$-Z where:
X and Z are independently a substituted or unsubstituted aromatic group or a substituted or unsubstituted aromatic complex ring group having one nitrogen atom;
n equals 1, 2, or 3; and
Y is a divalent aromatic group or a divalent aromatic complex ring group having one nitrogen atom. Useful examples include 1,4-bis(2-methylstyryl)-benzene, 4,4'-(9,10-anthracenediyldi-2,1-ethenediyl)bis(N,N-bis(4-methylphenyl)-benzenamine, 4,4'-(1,4-naphthalenediyldi-2,1-ethenediyl)bis(N,N-bis(4-methylphenyl)benzenamine, and 4,4'-(1,4-phenylenedi-2,1-ethenediyl)bis(N,N-(4-tolyl))benzeneamine.

The organic-based dopant is selected to provide emission between 300–1700 nm. The dopant can be selected from fluorescent or phosphorescent dyes. Useful fluorescent dopants include materials as described as host materials above. Other useful fluorescent dopants include, but are not limited to, derivatives of substituted or unsubstituted anthracene, tetracene, xanthene, perylene, rubrene, coumarin, rhodamine, and quinacridone, dicyanomethylenepyran compounds, thiopyran compounds, polymethine compounds, pyrilium and thiapyrilium compounds, fluorene derivatives, periflanthene derivatives, indenoperylene derivatives, bis(azinyl)amine boron compounds, bis(azinyl) methane compounds, napthyridine, fluoranthene, furan, indole, thiaphene, benzoxanthene, pyrene, peropyrene, terphenyl, quaterphenyl, quinquephenyl, sexiphenyl, anthanthrene, bisanthrene compounds, N,N,N',N'-tetrasubstituted benzidene derivatives, N,N,N',N'-tetrarylbenzidene derivatives and carbostyryl compounds or combinations thereof. Derivatives of these classes of materials can also serve as useful host materials or combinations thereof. Host materials will often be compounds containing at least three phenylene moieties.

Illustrative examples of useful dopants include, but are not limited to, the following:

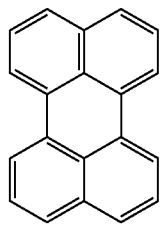

L1

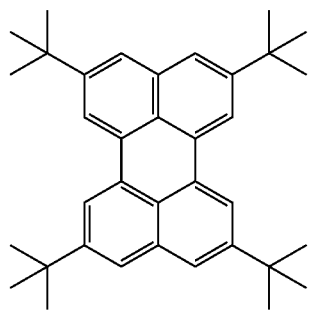

L2

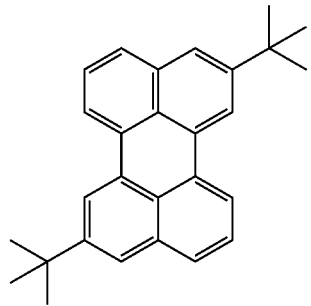

L3

-continued

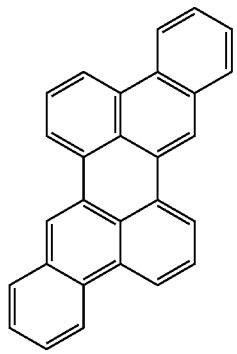

L4

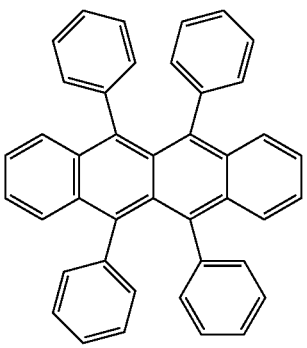

L5

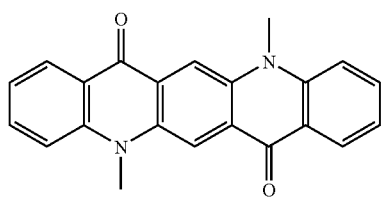

L6

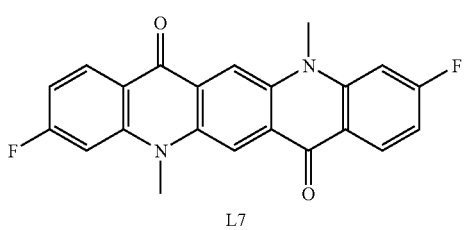

L7

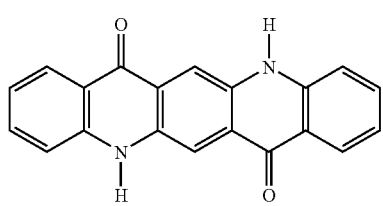

L8

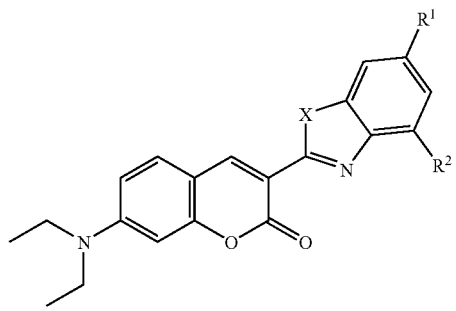

|     | X | R1     | R2     |
|-----|---|--------|--------|
| L9  | O | H      | H      |
| L10 | O | H      | Methyl |
| L11 | O | Methyl | H      |
| L12 | O | Methyl | Methyl |
| L13 | O | H      | t-butyl|
| L14 | O | t-butyl| H      |
| L15 | O | t-butyl| t-butyl|
| L16 | S | H      | H      |
| L17 | S | H      | Methyl |
| L18 | S | Methyl | H      |
| L19 | S | Methyl | Methyl |
| L20 | S | H      | t-butyl|
| L21 | S | t-butyl| H      |
| L22 | S | t-butyl| t-butyl|

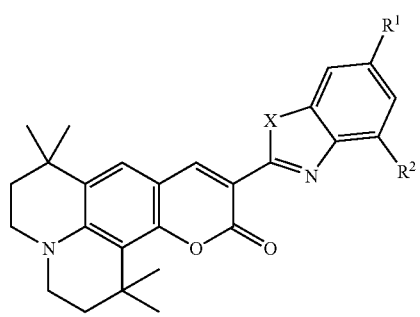

|     | X | R1     | R2     |
|-----|---|--------|--------|
| L23 | O | H      | H      |
| L24 | O | H      | Methyl |
| L25 | O | Methyl | H      |
| L26 | O | Methyl | Methyl |
| L27 | O | H      | t-butyl|
| L28 | O | t-butyl| H      |
| L29 | O | t-butyl| t-butyl|
| L30 | S | H      | H      |
| L31 | S | H      | Methyl |
| L32 | S | Methyl | H      |
| L33 | S | Methyl | Methyl |
| L34 | S | H      | t-butyl|
| L35 | S | t-butyl| H      |
| L36 | S | t-butyl| t-butyl|

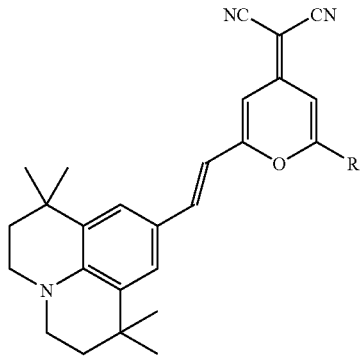

|     | R       |
|-----|---------|
| L37 | phenyl  |
| L38 | methyl  |
| L39 | t-butyl |
| L40 | mesityl |

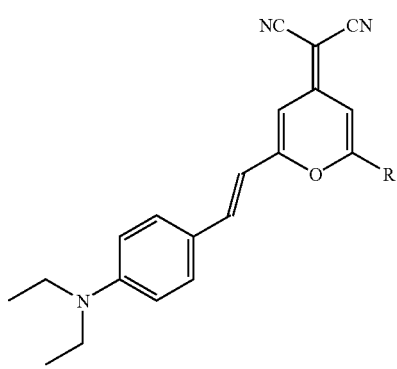

|     | R       |
|-----|---------|
| L41 | phenyl  |
| L42 | methyl  |
| L43 | t-butyl |
| L44 | mesityl |

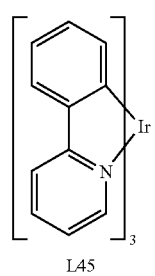

L45

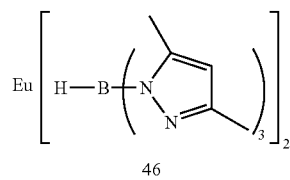

46

-continued
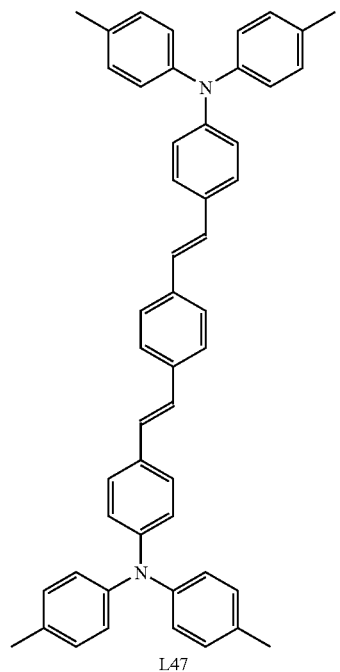
L47
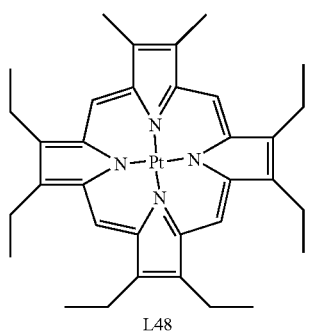
L49
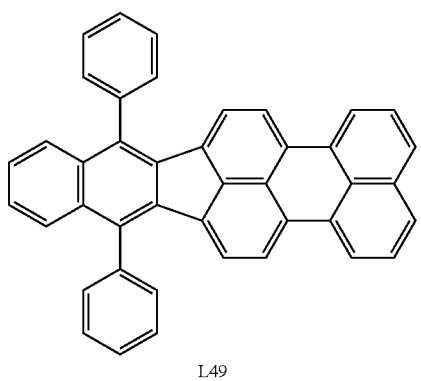
L48
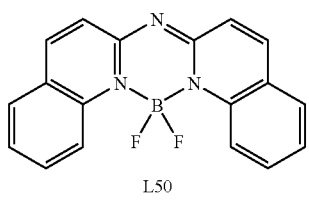
L50
-continued
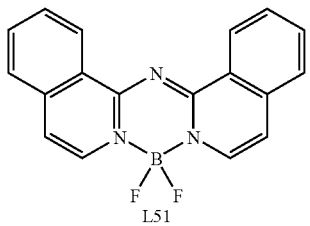
L51
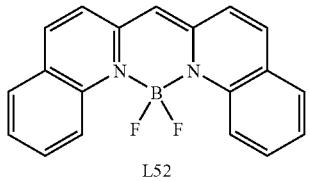
L52
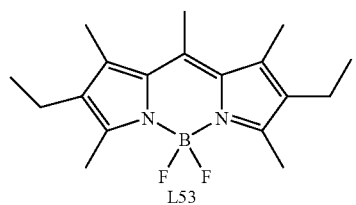
L53
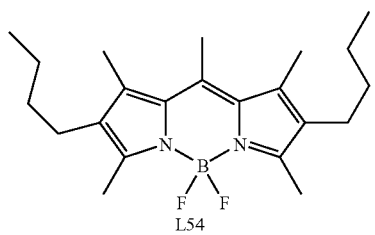
L54
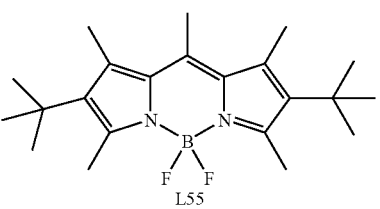
L55
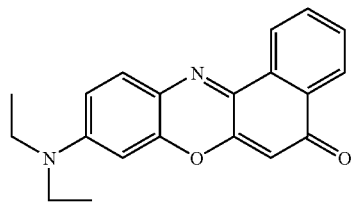
L56
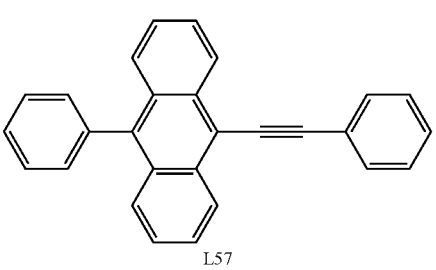
L57

-continued

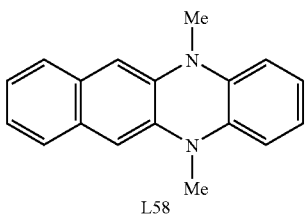
L58

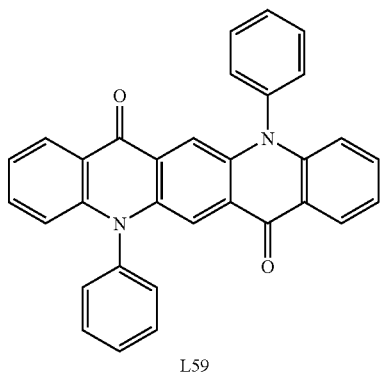
L59

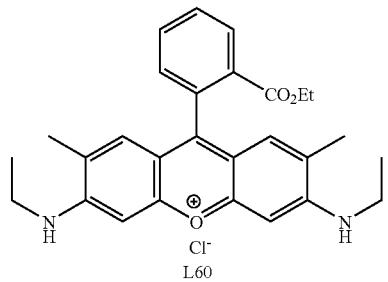
L60

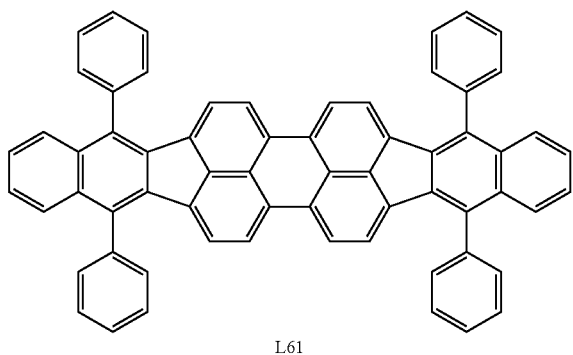
L61

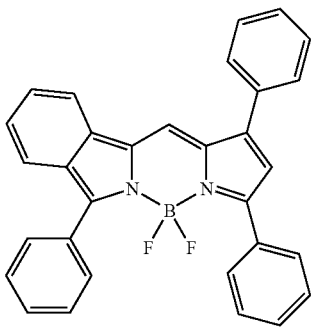
L62

Other emissive materials include various heterocyclic optical brighteners as described in U.S. Pat. No. 4,539,507.

The emissive material can also be a polymeric material, a blend of two or more polymeric materials, or a doped polymer or polymer blend. The emissive material can also include more than one nonpolymeric and polymeric material with or without dopants. Typical dopants are listed previously for nonpolymeric molecules. Nonpolymeric dopants can be molecularly dispersed into the polymeric host, or the dopant could be added by copolymerizing a minor constituent into the host polymer. Typical polymeric materials include, but are not limited to, substituted and unsubstituted poly(p-phenylenevinylene) (PPV) derivatives, substituted and unsubstituted poly(p-phenylene) (PPP) derivatives, substituted and unsubstituted polyfluorene (PF) derivatives, substituted and unsubstituted poly(p-pyridine), substituted and unsubstituted poly(p-pyridalvinylene) derivatives, and substituted, unsubstituted poly(p-phenylene) ladder and step-ladder polymers, and copolymers thereof as taught by Diaz-Garcia, et al. in U.S. Pat. No. 5,881,083 and references therein. The substituents include but are not limited to alkyls, cycloalkyls, alkenyls, aryls, heteroaryls, alkoxy, aryloxys, amino, nitro, thio, halo, hydroxy, and cyano. Typical polymers are poly(p-phenylene vinylene), dialkyl-, diaryl-, diamino-, or dialkoxy-substituted PPV, mono alkyl-mono alkoxy-substituted PPV, mono aryl-substituted PPV, 9,9'-dialkyl or diaryl-substituted PF, 9,9'-mono alky-mono aryl substituted PF, 9-mono alky or aryl substituted PF, PPP, dialkyl-, diamino-, diaryl-, or dialkoxy-substituted PPP, mono alkyl-, aryl-, alkoxy-, or amino-substituted PPP. In addition, polymeric materials can be used such as poly(N-vinylcarbazole) (PVK), polythiophenes, polypyrrole, polyaniline, and copolymers such as poly(3,4-ethylenedioxythiophene)/poly(4-styrenesulfonate) also called PEDOT/PSS.

The organic materials mentioned above are suitably deposited through sublimation, but can be deposited from a solvent with an optional binder to improve film formation. If the material is a polymer, solvent deposition is usually preferred. The material to be deposited by sublimation can be vaporized from a sublimator "boat" often comprised of a tantalum material, e.g. as described in U.S. Pat. No. 6,237,529, or can be first coated onto a donor sheet and then sublimed in closer proximity to the substrate. Layers with a mixture of materials can utilize separate sublimator boats or the materials can be pre-mixed and coated from a single boat or donor sheet.

Most organic-based laser devices are sensitive to moisture or oxygen, or both, so they are commonly sealed in an inert atmosphere such as nitrogen or argon. Desiccant such as alumina, bauxite, calcium sulfate, clays, silica gel, zeolites, alkaline metal oxides, alkaline earth metal oxides, sulfates, or metal halides and perchlorates can be incorporated into the sealed device. Methods for encapsulation and desiccation include, but are not limited to, those described in U.S. Pat. No. 6,226,890. In addition, barrier layers such as SiOx, Teflon, and alternating inorganic/polymeric layers are known in the art for encapsulation.

For the spacer layer 170 it is preferred to use a material that is highly transparent to both the laser light 190 and the pump-beam light 180. In this embodiment 1,1-Bis-(4-bis(4-methyl-phenyl)-amino-phenyl)-cyclohexane (TAPC) is chosen as the spacer material, since TAPC has very low absorption throughout the visible and near UV spectrum and TAPC's index of refraction is slightly lower than that of most organic host materials. This refractive index difference is useful since it helps in maximizing the overlap between the standing e-field antinodes and the periodic gain region(s) 160. Besides organic spacer materials, the spacer layer 170 can also be composed of inorganic materials, such as $SiO_2$, since $SiO_2$ has low absorption and its index of refraction is less than that of organic host materials. When using inorganic-based spacer layers, the materials can be deposited either by thermal evaporation, e-beam at low deposition temperatures (around 70° C.), or colloidal methods.

Following the deposition of the active region 130, it is necessary to spatially pattern the net gain of the periodic gain region(s) 160 in order to form the lower net gain regions 150. For the embodiment shown in FIG. 2, the lower net gain regions 150 are produced by locally spoiling the emissive properties of the periodic gain region(s) 160. An effective way to form the lower net gain regions 150 (for organic-based gain media) is to use standard photolithographic masks and UV exposing apparatus in order to produce a patterned UV exposure of the periodic gain region(s) 160. Since organic media is sensitive to high intensity UV light (for example the mercury arc lamp's i-line at 365 nm), this technique works very effectively to lower the emissive intensity of the UV exposed areas of the periodic gain region(s) 160. As discussed above, the UV exposed areas (the lower net gain regions 150) correspond to the interpixel region 210, while the unexposed areas correspond to the laser pixels 200. In the preferred embodiment the shape of the laser pixels 200 is circular; however, other pixel shapes are possible, such as rectangular. The size of the laser pixels 200 is in the range of 2.5 to 20 microns. For single transverse mode laser operation, the preferred laser pixel 200 diameter is 2.5 to 4.5 µm. The interpixel spacing is in the range of 0.25 to 4 µm. In general, the spaced laser pixels 200 can have the same or different sizes and the spacings between pixels can have the same or different lengths to cause the output of the two-dimensional VCSEL array device 100 to produce locally single or multimode laser output. It should be noted that the emissive intensity of the periodic gain region(s) 160 can be locally modulated by ways other than high intensity UV radiation, such as those ways commonly practiced in the art.

Following the growth of the active region 130 and the production of the lower net gain regions 150 is the deposition of the top dielectric stack 140. The top dielectric stack 140 is spaced from the bottom dielectric stack 120 and reflective to light over a predetermined range of wavelengths. The composition of the top dielectric stack 140 is analogous to that of the bottom dielectric stack. Since the top dielectric stack 140 is deposited over an active region 130 that contains organics (for the case of organic-based gain media), the top dielectric stack 140 deposition temperature must be kept low in order to avoid melting the organics. As a result, a typical deposition temperature for the top dielectric stack 140 is 100° C. or lower. The top dielectric stack can be deposited by conventional techniques, such as e-beam, low-energy sputtering, or colloidal deposition. In order to obtain good lasing performance, it is preferred that the peak reflectivities of the top and bottom dielectric stacks be greater than 99%, where smaller values result in larger lasing linewidths.

The two-dimensional VCSEL array device 100 is optically driven by an incident pump-beam light 180 and emits laser light 190. As a result of the small lasing power density threshold of organic-based VCSEL cavities, the pump-beam can be incoherent LED light. FIG. 2 shows laser light 190 through the top dielectric stack 140. Alternatively, the laser structure could be optically pumped through the top dielectric stack 140 with the laser light 190 through the substrate 110 by proper design of the dielectric stack reflectance properties. The operation of the two-dimensional VCSEL array device 100 occurs as follows. The pump-beam light 180 transmits through the substrate 110 and the bottom dielectric stack 120 and is absorbed by the periodic gain region(s) 160, wherein some fraction of the pump-beam energy is re-emitted as longer wavelength laser light at the position of the laser pixels 200. When the pump-beam light 180 enters through the substrate 110, to ensure that the laser light 190 mainly exits through the top dielectric stack 140, it is necessary to choose the top dielectric stack peak reflectance to be smaller than the bottom dielectric stack 120 peak reflectance. To improve the power conversion efficiency of the device, it is common practice to add additional dielectric layers to both dielectric stacks, such that the top dielectric stack 140 is highly reflective to the pump-beam light 180 and the bottom dielectric stack 120 is highly transmissive to the pump-beam light 180.

Figure 4:
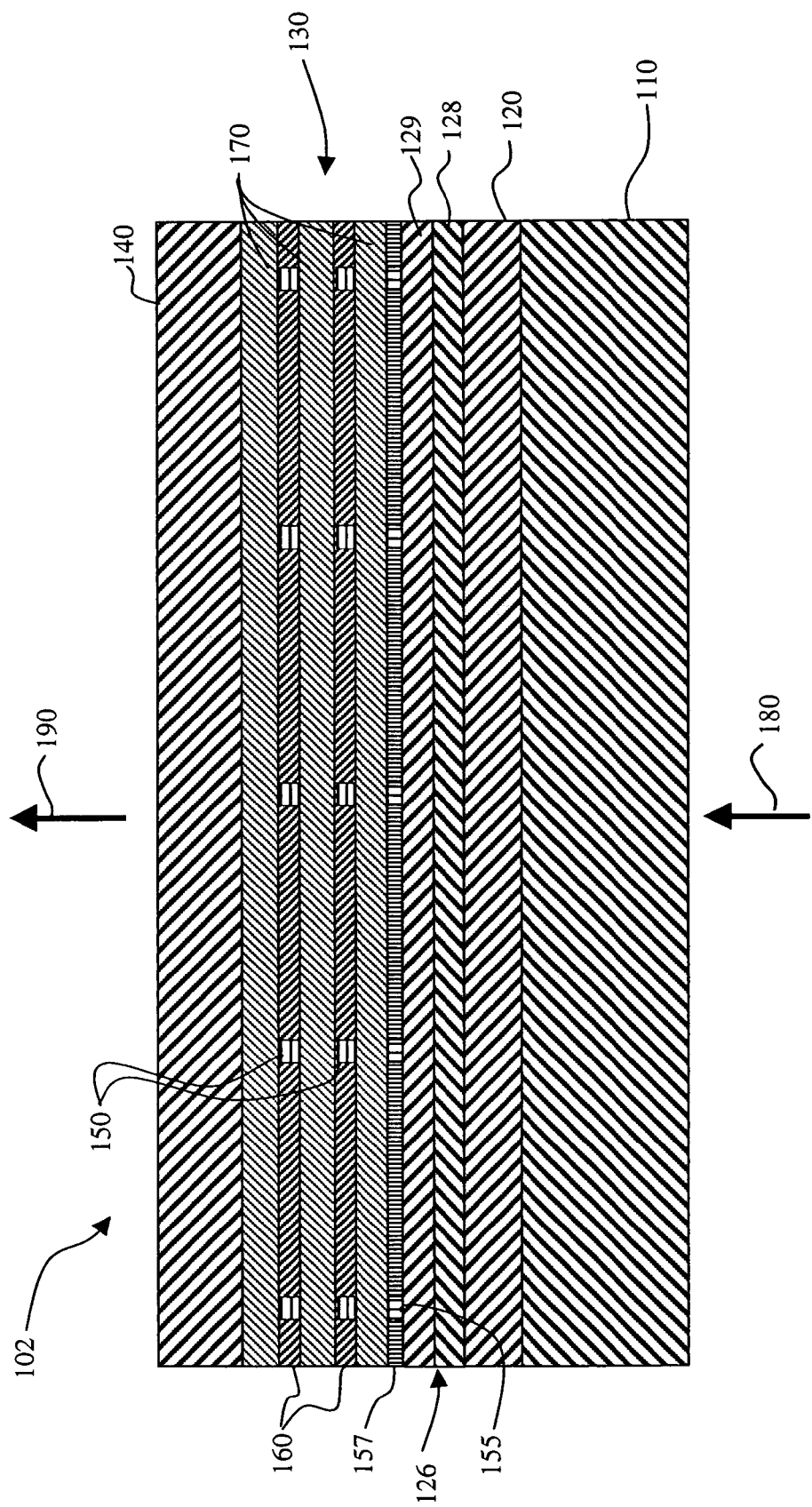
FIG. 4 shows a side view of another embodiment of an optically pumped two-dimensional VCSEL array light source which includes absorbing elements.

As discussed above, another way for spatially modulating the net gain of the periodic gain region(s) 160 is to modulate the excitation of the periodic gain region(s) 160 by the pump-beam light 180. Another embodiment of the present invention is given in FIG. 4, laser array device 102, which contains absorbing elements 155. In order to form micron-sized laser pixel features and to reduce diffraction effects, it is preferred that the absorbing elements 155 be placed adjacent to the active region 130. As discussed above, performing photolithographic-based processing on laser devices is difficult once the organics have been deposited; accordingly, it is preferred to place the absorbing elements between the birefringent layer 126 and the active region 130 as shown in FIG. 4. The composition of the absorbing elements 155 is any material that absorbs the pump-beam light 180 and only minimally absorbs and scatters the laser light 190. It is preferred that at the emission wavelengths of the pump-beam light 180, the absorbing elements' 155 absorption coefficient is greater than $10^4$ $cm^{-1}$. The thickness of the absorbing elements 155 is chosen such that a significant percentage of the pump-beam light 180 is absorbed by the elements. A preferred absorption fraction is greater than 50%. With regard to producing a patterned absorber layer, this can be accomplished by a number of ways. The first way is to deposit a uniform dye layer 157 and use patterned UV light to modify selectively the absorption coefficient of the dye layer 157. As discussed above with reference to FIG. 2, the UV light can be patterned using conventional photolithographic masks. With respect to modifying the absorption coefficient of the dye layer 157, this can be accomplished either through bleaching the dye molecules (lowering the absorption selectively) or by dissociating the dye molecules to produce a species, which more strongly absorbs the pump-beam light 180 (raising the absorption selectively). As stated above, it is preferred that both the dye layer 157 and the absorbing elements 155 only weakly absorb/scatter the laser light 190. A feature of the absorbing elements 155 is that it results in laser array device 102 being planar.

Figure 5:
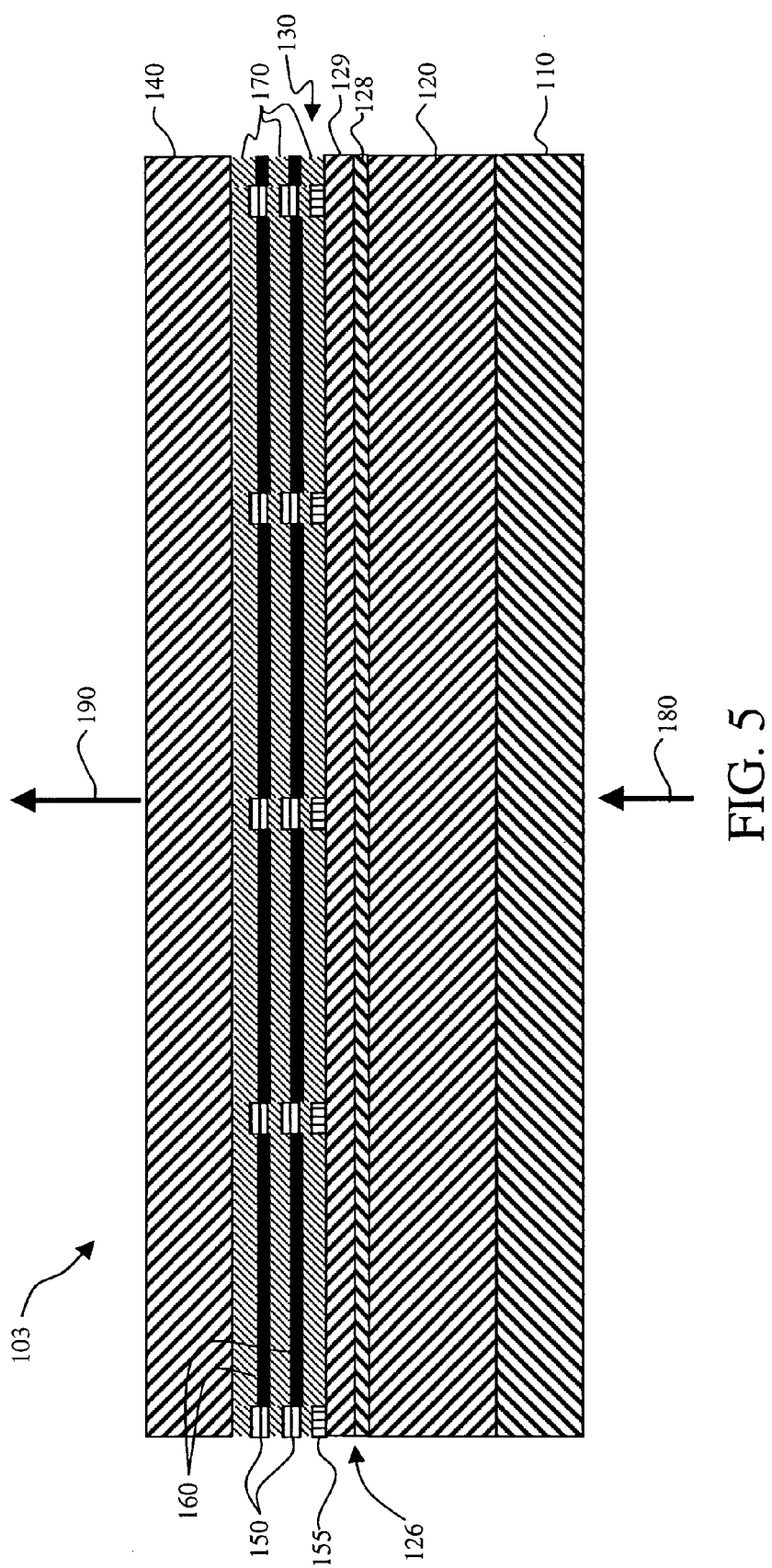
FIG. 5 shows a side cross sectional view of another embodiment of an optically pumped two-dimensional VCSEL array light source which includes dyed photoresist absorbing elements.

Another way for depositing the absorbing elements 155 is to use a dyed photoresist. The resulting laser array device 103 is illustrated in FIG. 5. These types of dyed photoresists are well known in the art; and are spin cast and patterned by standard photolithographic techniques. For either laser array device 102 or 103, following the production of the spaced-apart absorbing elements 155, the active region 130 and the top dielectric stack 140 are deposited in sequence. Since the absorbing elements 155 need to be placed between the birefringent layer 126 and the active region 130, and absorb a portion of the pump-beam light 180, it is necessary for the pump-beam light 180 to enter through the substrate 110. There are also other ways, as commonly practiced in the art, to produce the absorbing elements 155. For example, etched pits can be formed in a transparent layer (such as $SiO_2$), over which can be deposited the absorbing elements 155 material. Next, standard chemical mechanical polishing (CMP) techniques can be used to polish down the absorbing elements 155 material such that the absorbing elements 155 only remain in the etched pit regions. As discussed above, the positions of the absorbing elements 155 correspond to the interpixel region 210, while the remaining areas correspond to the laser pixels 200. In the preferred embodiment the shape of the laser pixels 200 is circular; however, other pixel shapes are possible, such as rectangular. The size of the laser pixels 200 is in the range of 2.5 to 20 microns. For single transverse mode laser operation, the preferred laser pixel 200 diameter is 2.5 to 4.5 µm. The interpixel spacing is in the range of 0.25 to 4 µm. In general, the spaced laser pixels 200 can have the same or different sizes and the spacings between pixels can have the same or different lengths to cause the output of the two-dimensional laser array device 102 or 103 to produce locally single or multimode laser output.

Figure 6:
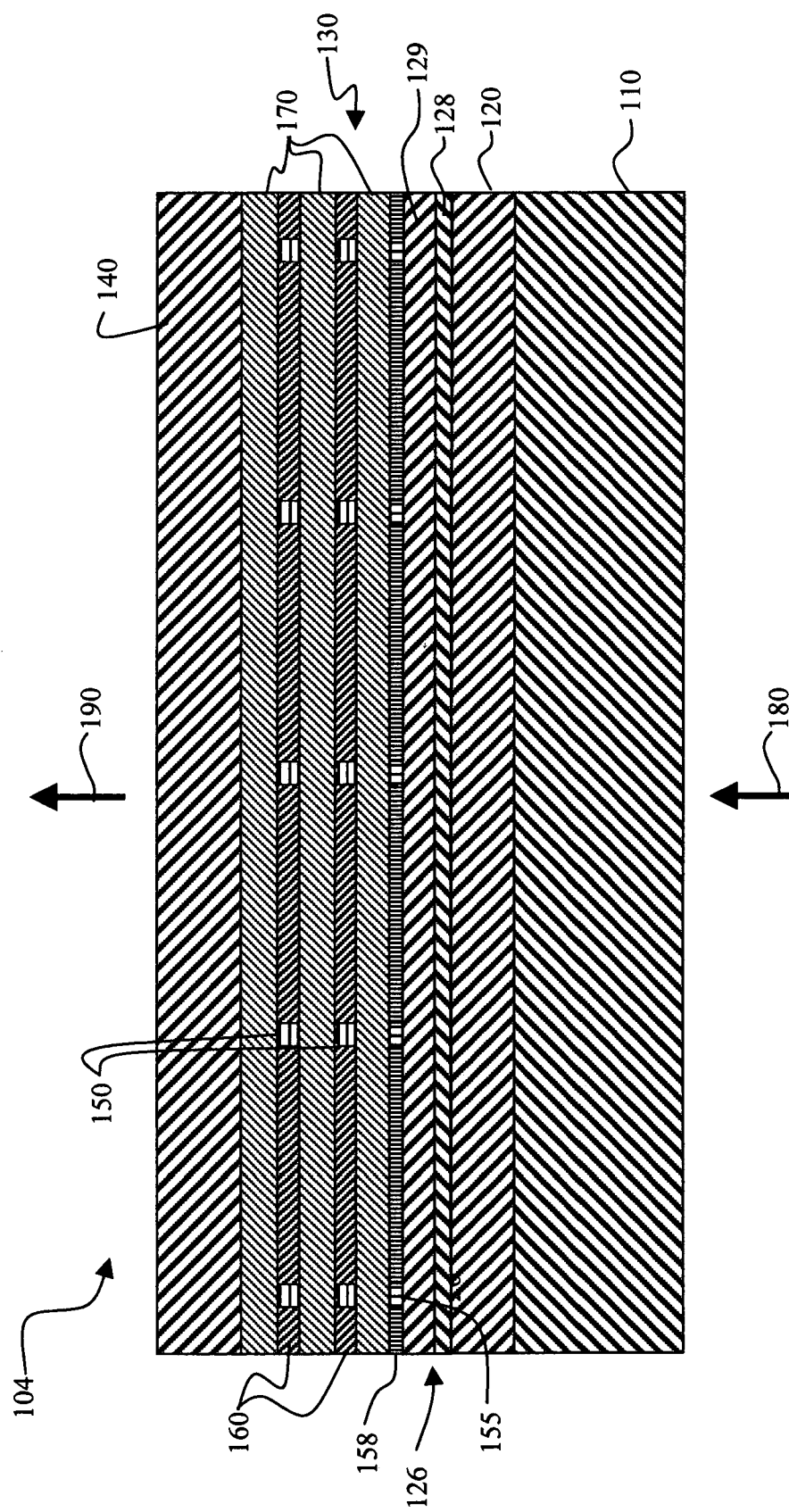
FIG. 6 shows a side cross sectional view of another embodiment of an optically pumped two-dimensional VCSEL array light source which includes planarized absorbing elements.

FIG. 6 shows another embodiment of the present invention. This laser array device 104 is a variation of the one illustrated in FIG. 5. In FIG. 5 the active region 130 is grown directly on the absorbing elements 155. As a result, the active region 130 and the top dielectric stack 140 are deposited on a non-planar (corrugated) surface for the case of the absorbing elements formed by dyed photoresist (note that the case of growing in the etch pits followed by CMP results in a planar surface). For certain multilayer stack combinations, such as $TiO_2$—$SiO_2$, deposition on a corrugated surface can lead to columnar growth of the stacks. As a result, there are enhanced scattering losses in the top dielectric stack 140. To overcome this problem the absorbing elements 155 are planarized by a planarization layer 158, using techniques well known in the art, prior to depositing the active region 130. In one embodiment, following the production of the spaced apart absorbing elements 155, the planarization layer 158 material is deposited by suitable processes. Next, using CMP techniques, which are well known in the art, the planarization layer 158 material is polished until it is flush (or within a couple tens of nanometers) with the top surface of the absorbing elements 155. A second embodiment of the planarization layer 158 is to use polymethyl-methacrylate (PMMA). In this case, PMMA is spun cast over the spaced apart absorbing elements 155 to a thickness range of 0.5 to 3.0 µm, followed by a conventional bake at 150 to 220° C. Scanning electron microscope (SEM) images reveal that a 3:1 or 4:1 PMMA thickness to absorbing element thickness ratio typically results in the planarization of the PMMA surface. Besides these three embodiments for planarization, other methodologies are possible as practiced by those skilled in the art. In summary, the addition of the planarization layer 158 following the production of the spaced apart absorbing elements 155 and prior to the deposition of the active region 130, leads to less scattering loss in the active region 130 and in the top dielectric stack 140 and results in higher power conversion efficiencies for the case of the absorbing elements 155 formed by dyed photoresist.

Figure 7:
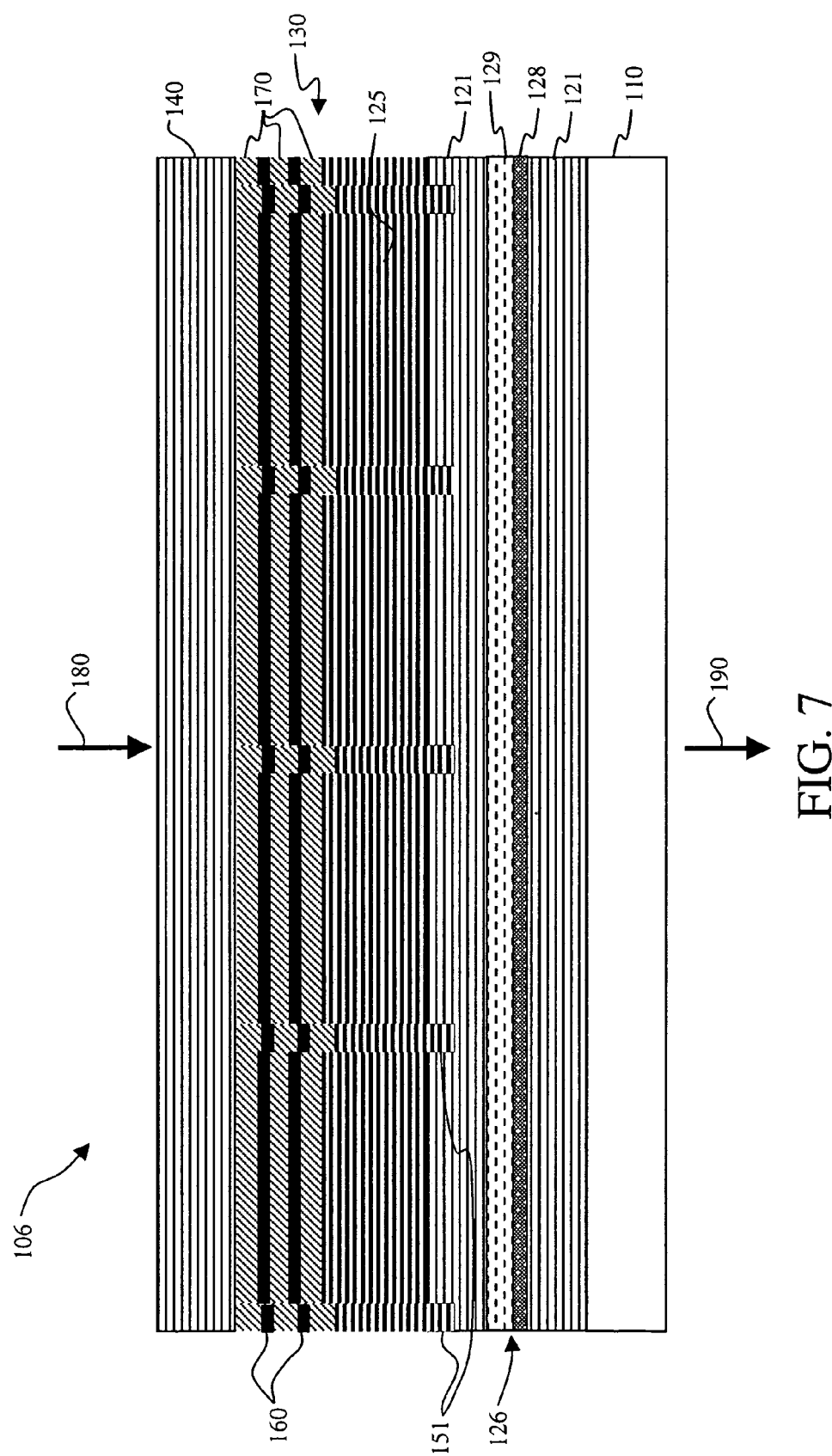
FIG. 7 shows a side cross sectional view of another embodiment of an optically pumped two-dimensional VCSEL array light source which includes an etched dielectric stack.

FIG. 7 shows another embodiment of the present invention, laser array device 106. In this case, spatially modulating the net gain of the VCSEL device is provided by selectively etching (reflectance modulation) the bottom dielectric stack 120. In order to reduce scattering losses and correspondingly boost the power conversion efficiency, it is preferred that the etched surface of the bottom dielectric stack be removed from the position of the active region 130 where the intensity of the standing electromagnetic field (e-field) is highest. As a result, the bottom dielectric stack 120 is deposited in two parts, a first portion 121 and a second portion 125, whereby the reflectance modulation is obtained by forming an etched region 151 in the surface of the first portion of the bottom dielectric stack 121. In order to distance the etched region 151 from the active region 130, it is preferred that the first portion of the bottom dielectric stack 121 contain at most 3 to 5 dielectric layers which reflect the laser light. For cases where additional dielectric layers are added to the bottom stack for reflecting the pump-beam light 180 back into the active region 130, these layers are to be deposited first in the first portion of the bottom dielectric stack 121.

The patterned etched region 151 is formed in the first portion of the bottom dielectric stack 121 by using standard photolithographic and etching techniques, thus forming a two-dimensional array of circular pillars on the surface of the first portion of the bottom dielectric stack 121. In the preferred embodiment the shape of the laser pixels is circular; however, other pixel shapes are possible, such as rectangular. The interpixel spacing is in the range of 0.25 to 4 µm. Via experimentation it has been determined that either one or two periods of the first portion of the bottom dielectric stack 121 should be removed to produce the etched region 151. Etching deeper than this typically resulted in laser arrays with poorer performance. The second portion of the bottom dielectric stack 125 is deposited over the first portion of the bottom dielectric stack 121 after having formed the etched region 151. As shown schematically in FIG. 7, the second portion of the bottom dielectric stack 125 fills the etched region 151. The second portion of the bottom dielectric stack 125 is composed of alternating layers of high and low refractive index dielectric materials, such as $TiO_2$ and $SiO_2$, respectively. As for the first portion, the second portion can be deposited by e-beam, PECVD, sputtering, sol-gel methods or colloidal deposition.

Figure 8:
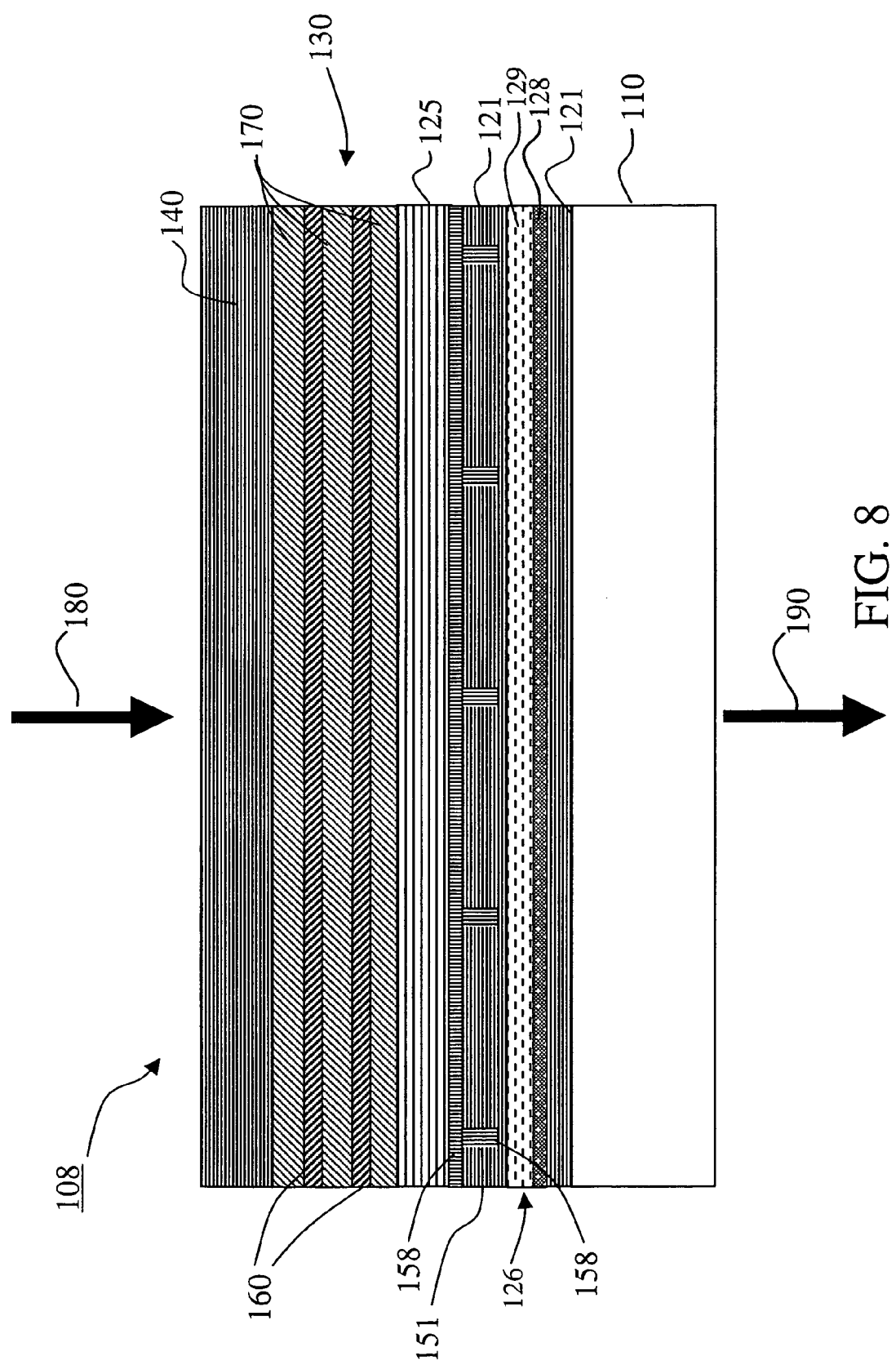
FIG. 8 shows a side cross sectional view of another embodiment of an optically pumped two-dimensional VCSEL array light source which includes an etched dielectric stack that has been planarized.

FIG. 8 shows another embodiment of the present invention. This laser array device 108 is a variation of the one illustrated in FIG. 7. In FIG. 7, the second portion of the bottom dielectric stack 125 is grown directly on the etched region 151. As a result, the stack is deposited on a non-planar (corrugated) surface. For certain multilayer stack combinations, such as $TiO_2$—$SiO_2$, deposition on a corrugated surface can lead to columnar growth of the stacks. As a result, there are enhanced scattering losses in the second portion of the bottom dielectric stack 125. To overcome this problem, the etched surface of the first portion of the bottom dielectric stack 121 is planarized by a planarization layer 158 prior to depositing the second portion of the bottom dielectric stack 125. One embodiment of the planarization layer 158 is polyimide for the $Ta_2O_5$—$SiO_2$ or $TiO_2$—$SiO_2$ multilayer stack systems. Following the production of the etched regions 151, 2 to 3 microns of polyimide are deposited on the surface of the first portion of the bottom dielectric stack 121 by spin casting and then hardened by a bake at temperatures ranging from 180 to 250° C. Next, using CMP techniques, which are well known in the art, the polyimide is polished until it is flush (or within a couple tens of nanometers) with the top surface of the first portion of the bottom dielectric stack 121 at the positions of the laser pixels 200. Because of the large difference in the polish rates of polyimide and oxides in standard CMP slurries, it is straightforward to have the polishing stop just as it begins to polish the oxide layers at the positions of the laser pixels 200.

A second embodiment of the planarization layer 158 is $SiO_2$ for the $Ta_2O_5$—$SiO_2$ multilayer dielectric stack system. In this case, the top layer of the first portion of the bottom dielectric stack 121 is a thin layer of $Si_3N_4$. The silicon nitride can be deposited by plasma-enhanced chemical vapor deposition (CVD) at a temperature range of 300–400° C. and in a thickness range of 10 to 200 nm. Following the formation of the etched region 151 (where the etch goes through the nitride layer and 1 to 2 periods of the first portion of the bottom dielectric stack 121), the planarization layer 158 of $SiO_2$ is deposited at a thickness of 0.75 to 2.0 µm by either CVD or thermal evaporation. As for the polyimide embodiment, CMP is used with another common slurry to polish the $SiO_2$ until it is flush (or within a couple tens of nanometers) with the top of the silicon nitride layer. As result of a polish selectivity of greater than 3.5:1, it is again straightforward to stop the polishing as it begins to polish the top of the silicon nitride layer. A third embodiment of the planarization layer 158 is PMMA for any multilayer dielectric stack system. In this case, PMMA is spun cast over the etched surface of the first portion of the bottom dielectric stack 121 to a thickness range of 0.5 to 3.0 µm, followed by a conventional bake at 150 to 220° C. Besides these three embodiments for planarization, other methodologies are possible as practiced by those skilled in the art. In summary, the addition of the planarization layer 158 following the production of the etched regions 151 and prior to the deposition of the second portion of the bottom dielectric stack 125, leads to less scattering loss in the active region 130 and in the bottom and top dielectric stacks and results in higher power conversion efficiencies.

Figure 9:
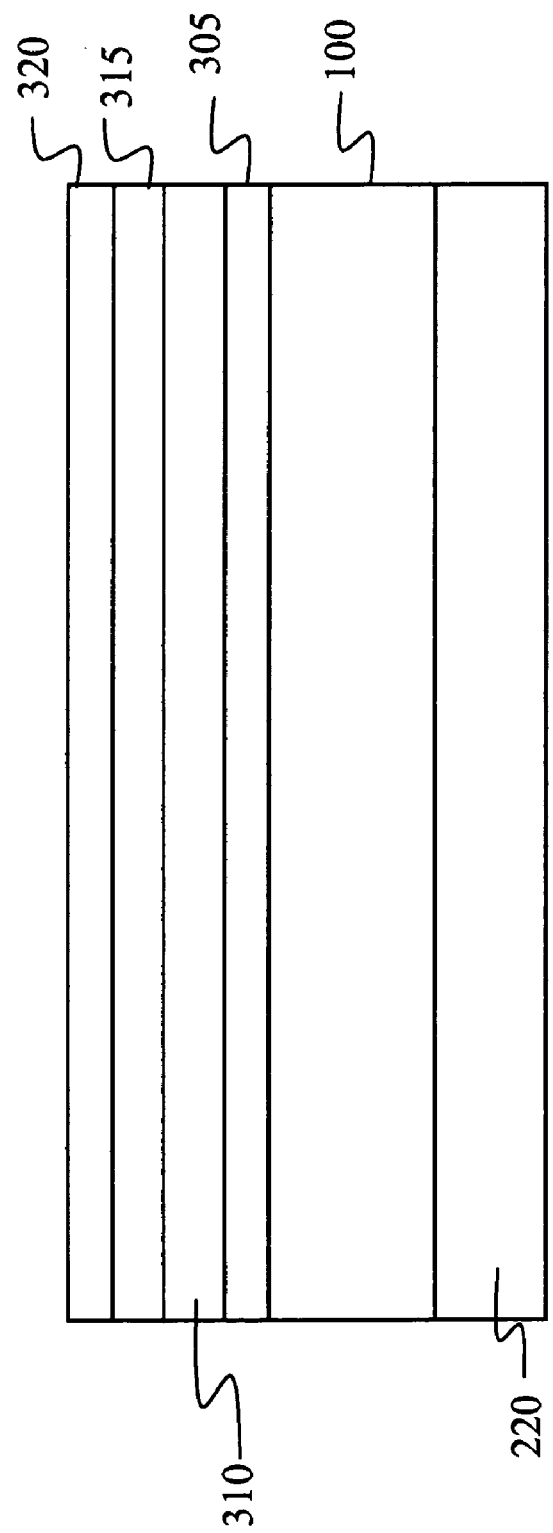
FIG. 9 is a simplified schematic of the display device containing the VCSEL array light source.
Figure 10:
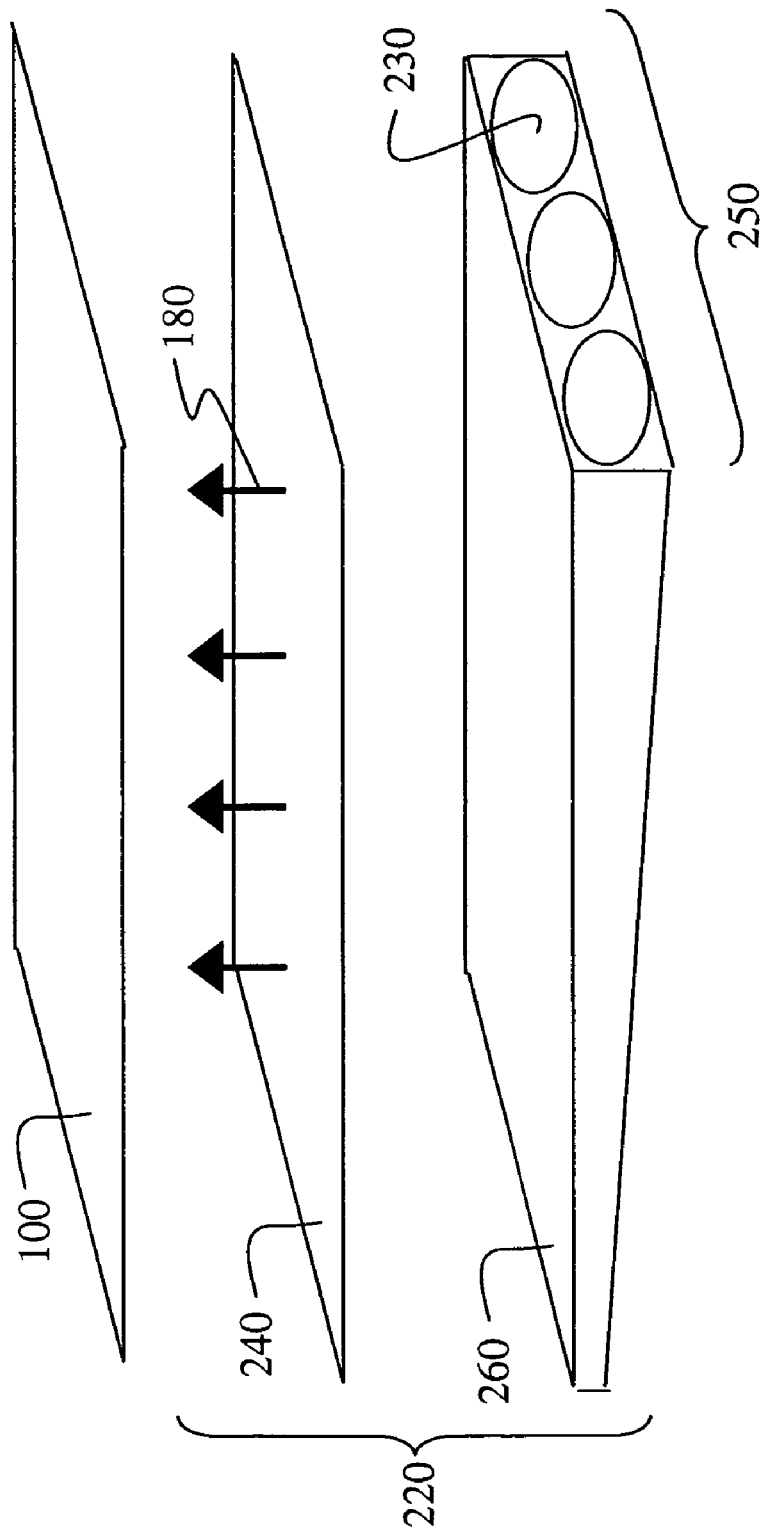
FIG. 10 is a simplified schematic of a linear LED-array driven backlight unit pumping the VCSEL array light source.
Figure 11:
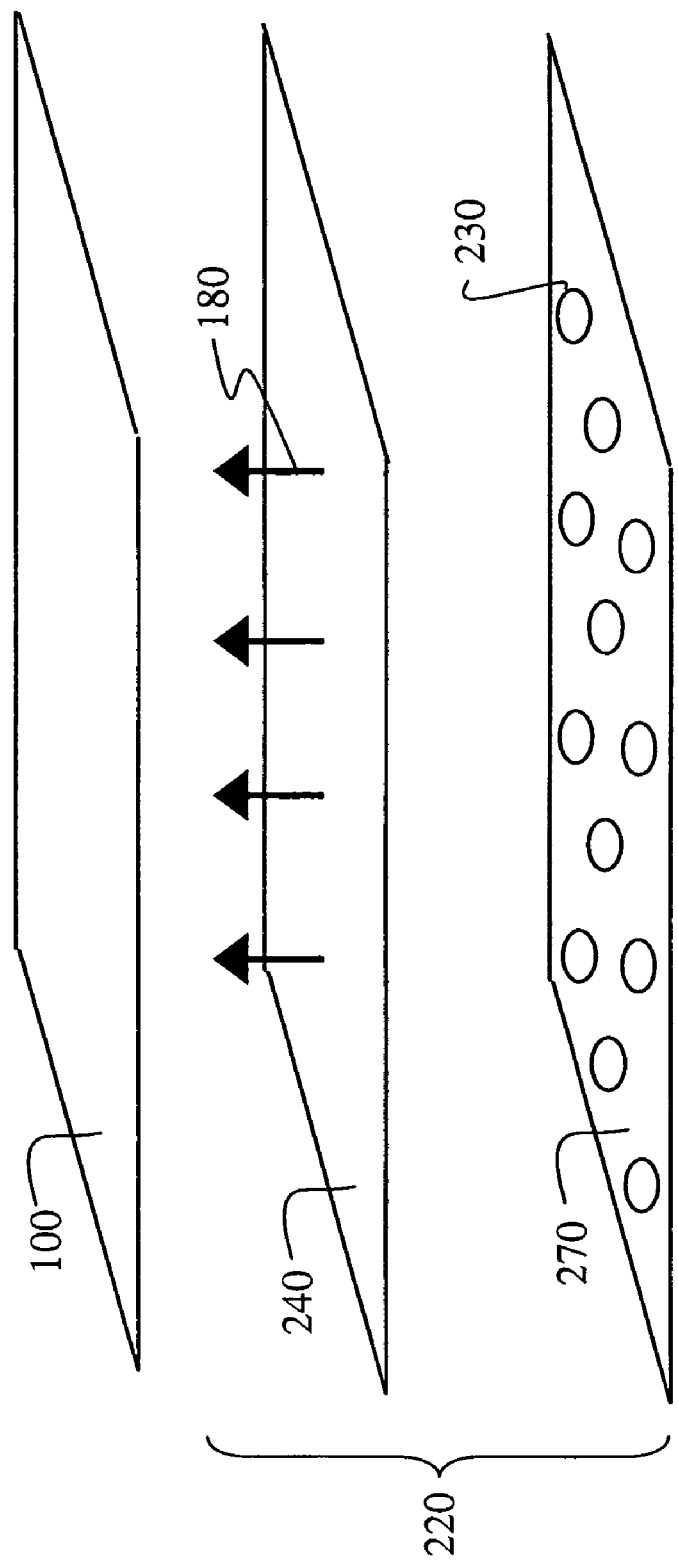
FIG. 11 is a simplified schematic of a planar LED-array driven backlight unit pumping the VCSEL array light source.
Figure 12:
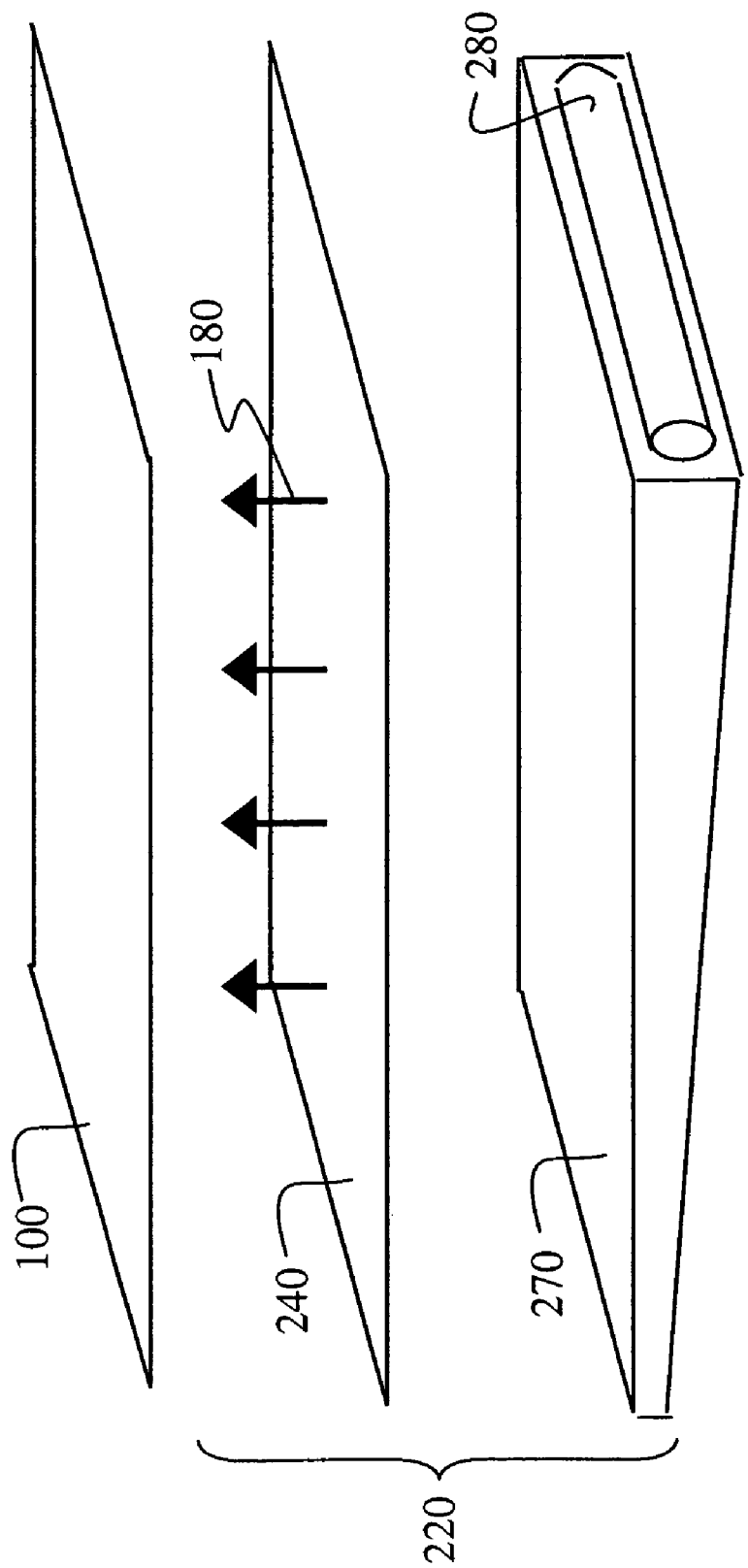
FIG. 12 is a simplified schematic of a cold cathode fluorescent lamp driven backlight unit pumping the VCSEL array light source.
Figure 13:
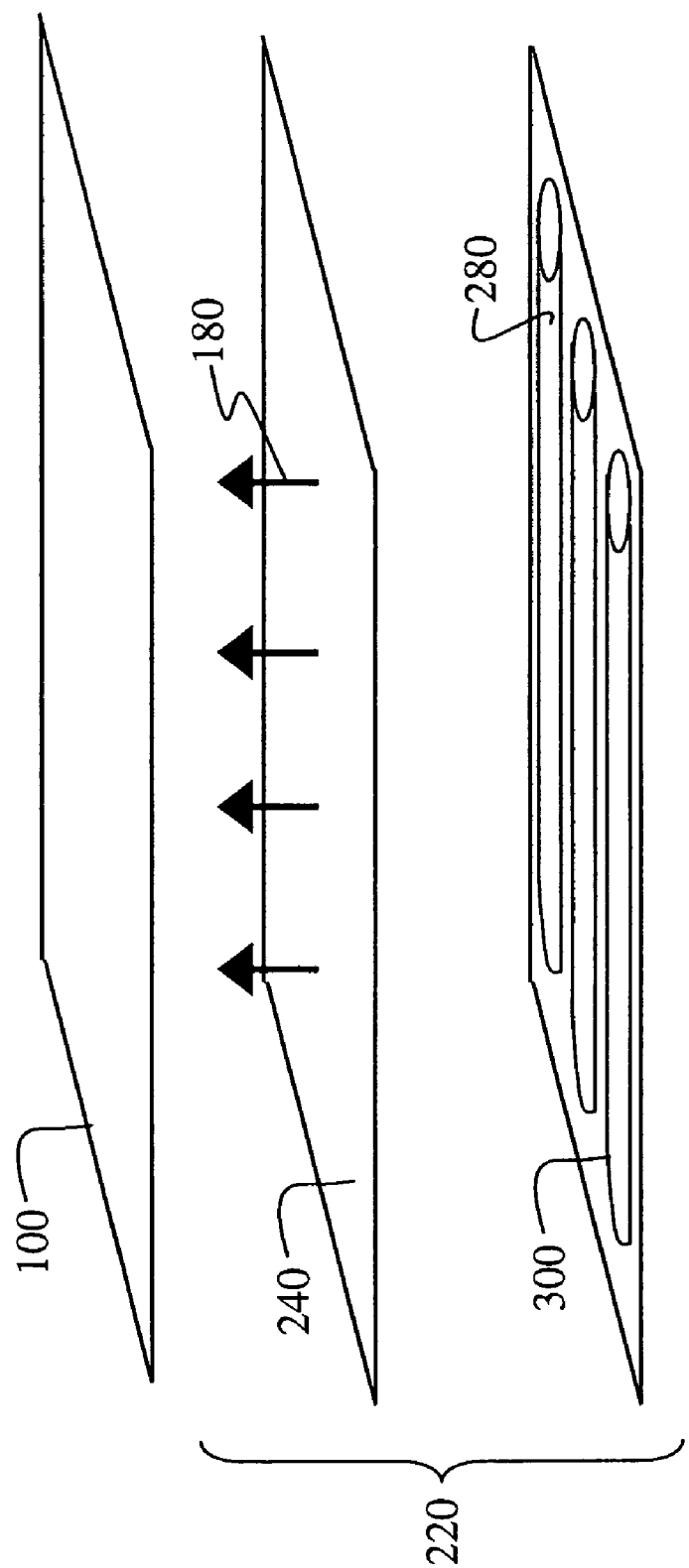
FIG. 13 is simplified schematic of another embodiment of a cold cathode fluorescent lamp driven backlight unit pumping the VCSEL array light source.

With the invention of a display containing the VCSEL array device 100, a simplified liquid crystal display can be made. The more simplified LCD, as shown in FIG. 9, typically contains a backlight unit 220, the blue emitting VCSEL array device 100, a polarizer layer 305, a light shutter layer 310, a red/green dielectric stack 315, and a color conversion layer 320. The backlight unit 220 provides the pump-beam light 180 for the VCSEL array device 100. The VCSEL array device 100 provides a blue light source for the polarizer layer 305. If the VCSEL array device 100 includes the birefringent layer 126, then its output is also polarized and the polarizer layer 305 can be limited. Otherwise the polarizer layer 305 passes one polarization of the laser light 190 to the light shutter layer 310. The light shutter layer 310 either passes or blocks light in a pixelated structure. The color conversion layer 320 selectively absorbs the blue laser light and down converts it to red and green colored light at the positions of the red and green display pixels. The red/green dielectric stack 315 is placed between the color conversion layer 320 and the light shutter layer 310 in order that the red and green colored light only propagates in the direction of the viewer. At the positions of the blue display pixels, no down conversion occurs. As a result, at the position of the blue display pixels, the color conversion layer 320 contains forward scattering elements in order to increase the angular emission cone of the collimated blue laser light.

The backlight unit 220, as shown in FIGS. 10–13 for producing the pump-beam light 180, is comprised of a diffuser 240 and either light emitting diodes (LEDs) 230 or a cold cathode fluorescent lamp (CCFL) 280. The diffuser 240 homogenizes the light incident on the VCSEL array device 100. The LEDs 230 are typically either in a linear array 250 illuminating the edge of a waveguide 260, which then redirects the light such that the light illuminates the VCSEL array device 100, or in a planar array 270 directly illuminating the VCSEL array device 100. The CCFL 280 is typically either illuminating the edge of the waveguide 260, which redirects the light such that it is illuminating the VCSEL array device 100, or oriented in rows 300 underneath the diffuser and directly illuminating the VCSEL array device 100.

Figure 14:
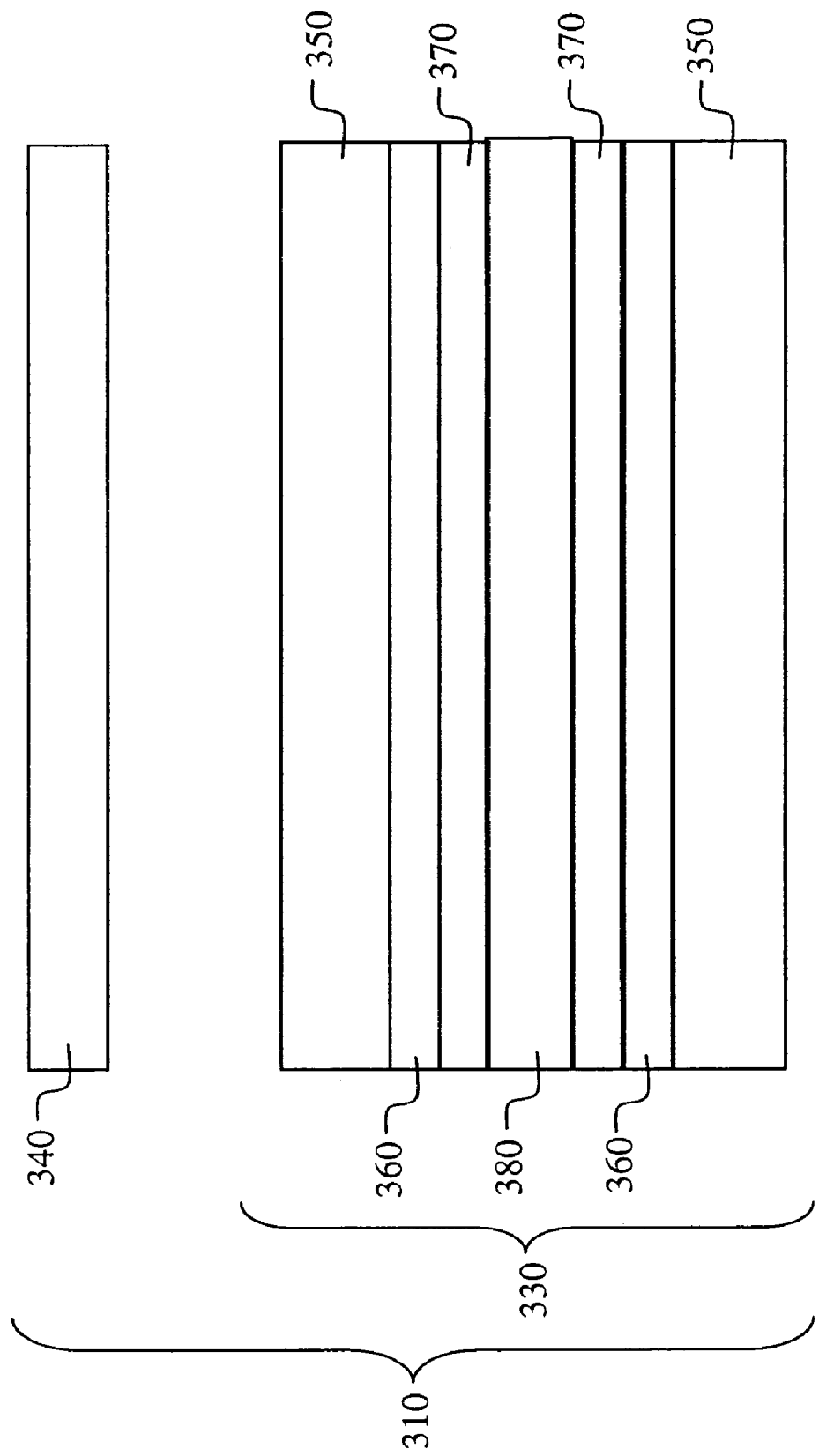
FIG. 14 is a simplified schematic of the liquid crystal cell and its components, including the analyzer.

The light shutter layer 310, as shown in FIG. 14, is typically a liquid crystal cell 330 with an analyzer 340 on the side farthest from the VCSEL array device 100. The liquid crystal cell 330 is analogous to conventional liquid crystal cells except that it does not contain a CFA. The liquid crystal cell 330 does not require a CFA since the blue light output from the light shutter layer 310 is incident on a pixelated color conversion layer 320, which selectively down converts the blue light into red and green light at the locations of the red and green display pixels. The liquid crystal cell 330 comprises liquid crystal substrates 350 on the top and bottom. The substrates liquid crystal 350 in the liquid crystal cell 330 can include either glass plates or plastic substrates. The thickness of the substrates liquid crystal 350 should be sufficiently thin to prevent parallax, which would result in light leakage through adjacent pixels. The thickness of the substrates liquid crystal 350 should preferably be less then 0.5 mm. Both of the substrates liquid crystal 350 are coated with a patterned transparent conductor layer 360. Typical transparent conductors are indium tin oxide. On top of each of the transparent conductor layers 360 is coated an alignment layer 370. Lastly, between the two alignment layers 370 is coated the liquid crystal material 380. The liquid crystal cell 330 modulates the blue light intensity output from the VCSEL array device 100 by orienting the liquid crystal molecules upon selective application of voltages. The liquid crystal cell 330 should be tuned so that the dark state is optimized for the wavelength of the incident blue laser light from the VCSEL array device 100. The liquid crystal cell 330 can also contain thin film transistors at each pixel location, permitting the display to be driven actively. However, the invention does not require a specific drive scheme. The light shutter layer 310 also contains the analyzer 340, which resolves the polarized light output from the liquid crystal cell 330.

Those skilled in the art will appreciate that other light shutters can be used with the present invention. An example is a light shutter produced by electrowetting. In this light switch, as demonstrated by Hayes, et al., Nature, 425, 383 (2003), the application of an electric field changes the degree to which dye-containing oil droplets cover the surface of each pixel. In effect, the electric field modifies the hydrophobicity of the pixel surface. In their article, Hayes, et al., Nature, 425, 383 (2003) envisioned their switch used for a reflective display, where the reflection is produced by a white reflector in back of the oil droplets. The electrowetting switch could also be used in transmission if the backplane is clear instead of reflective.

The color conversion layer 320 selectively absorbs the modulated blue laser light and down converts it to red and green colored light at the positions of the red and green display pixels. In order to down convert the blue light to red and green colored light, the layer can comprise red and green emitting organic fluorescent dyes in a solid matrix, respectively. Organic fluorescent dyes have the advantages of high fluorescent quantum efficiencies and high absorption cross-sections. In addition, they can be deposited by cost effective deposition techniques, such as spin coating. Candidate red and green high quantum efficiency organic dyes are [4-(dicyanomethylene)-2-t-butyl-6-(1,1,7,7-tetramethyljulolidyl-9-enyl)-4H-pyran] (DCJTB) and [10-(2-benzothiaz-olyl)-2,3,6,7-tetrahydro-1,1,7,7-tetramethyl-1H,5H,1H-[1] Benzopyrano[6,7,8-ij]quinolizin-11-one] (Coumarin 545T), respectively. Both have fluorescent quantum efficiencies near 100% (in solid films) and large absorption cross-sections in the 460–480 nm wavelength range, where the blue VCSEL array device 100 would be emitting. Besides using organic fluorescent dyes as the down converters, recent results point to the viability of using inorganic quantum dots as the fluorescent compounds in the color converter layer 320. For example, colloidal CdSe/CdS heterostructure quantum dots have demonstrated quantum yields above 80%, A. P. Alivisatos, MRS Bulletin 18 (1998). The solid matrix containing the organic or inorganic fluorescent material should be transparent to visible wavelength light and capable of being deposited by inexpensive processes. Preferred solid matrices are transparent plastics, such as polyvinyl acetate or PMMA. In doping the matrices with the organic dyes, the dye concentration needs to be kept just below where concentration quenching begins to occur. As such, the doping concentration would be in the 0.5–2% range for DCJTB and Coumarin 545T.

Even though the internal quantum efficiencies are nearly 100% for select organic fluorescent dyes, the external quantum efficiencies can be limited as a result of light trapping in the solid matrix. A preferred way for increasing the external quantum efficiencies is to include scattering centers with the dye particles when depositing them along with the solid matrix material. The scattering particles should have diameters on the order of one-half of the emission wavelength (red and green), indices different from that of the solid matrix, and be transparent throughout the visible spectral range. A preferred particle would be $TiO_2$ as a result of its transparency throughout the visible spectrum and its large index of refraction.

Since the display light needs to be directed towards the viewer, the red/green dielectric stack 315 is placed between the color conversion layer 320 and the light shutter layer 310. The red/green dielectric stack 315 needs to reflect greater than 90% of the red and green emission and pass at least 90% of the blue laser light. It is preferred that the red/green dielectric stack 315 be deposited by an inexpensive methodology, such as polymeric extrusion, colloidal deposition, or plasma enhanced chemical vapor deposition. Other methodologies are possible as commonly practiced in the art.

As stated above, the color converter layer 320 contains blue pixels that pass the blue laser light without down conversion. Because of the narrow divergence angle of the blue laser light, the blue pixels need to incorporate materials that increase the angular emission cone of the blue light. As is well known in the art, scattering particles can be selected which preferentially scatter the blue laser light in the forward direction. As for the green and red pixels, the scattering particles should have indices different from that of the solid matrix and be transparent. Both the size and index of refraction of the scattering particles are chosen according to well known formulations that enhance forward scattering. Besides increasing the angular emission cone by including scattering particles in the blue pixel matrix, other methodologies are possible as commonly practiced in the art.

The blue, green, and red pixels of the color converter layer 320 need to be on the order of 80×240 µm and be deposited selectively using a cost effective procedure. One methodology is to incorporate the fluorescent particles and the scattering particles in a photoresist formulation. This approach has been used to make dyed photo-imageable photoresist (the CFA is commonly deposited by this technique), where dyed particles are added to the photoresist formulation. Using this approach, the blue, green, and red portions of the color converter layer 320 can be selectively deposited using photolithographic techniques that are well known in the art. Besides selective deposition by photolithographic methodologies of the color converter layer 320, other methodologies can be employed as commonly practiced in the art.

Besides the efficiency gain obtained by removal of the CFA from the light shutter layer 310, having a large area, blue-emitting VCSEL array device as the light source brings other advantages. Since the blue laser light emission is nearly collimated, both the viewing angle compensation films and the collimating films (typically found in the BLU) can be removed from the display structure. As a result of the limitation of the viewing angle compensation films and the collimating films from the display structure, the cost of the liquid crystal display device can be reduced.

With the introduction of the birefringent layer 126 (or some other common means for affecting a preferred polarization of the VCSEL array light output) as a component in the VCSEL array device 100, the multimode laser light output from the two-dimensional vertical cavity laser array will be polarized preferentially along one direction. As a result, the bottom polarizer element and its associated reflective polarizer element are not needed in the backlight unit 220. Removal of these elements from the display structure results in a cost savings. In another embodiment of the current invention, no effort can be made to preferentially polarize the VCSEL output. In that case it will be necessary to add the polarizer layer 305 in between the top of the VCSEL array device 100 and the bottom of the light shutter layer 310. As a result of the divergence of the VCSEL light output as discussed above, it is preferred that the added polarizer layer 305 be as thin as practical. For example, recent polarizers have thicknesses on the order of 10 µm.

The invention has been described in detail with particular reference to certain preferred embodiments thereof, but it will be understood that variations and modifications can be effected within the spirit and scope of the invention.

PARTS LIST 1 optic axis
3 x-y-z coordinate system
5 display surface
7 display normal direction
9 optic axis
100 VCSEL array device
102 laser array device
103 laser array device
104 laser array device
106 laser array device
108 laser array device
110 substrate
120 bottom dielectric stack
121 first portion of the bottom dielectric stack
125 second portion of the bottom dielectric stack
126 birefringent layer
128 alignment layer
129 birefringent material
130 active region
140 top dielectric stack
150 lower net gain regions
151 etched region
155 absorbing elements
157 dye layer 158 planarization layer
160 periodic gain region
170 spacer layers
180 pump-beam light
190 laser light Parts List (Con't)

200 laser pixel
205 emitting element
210 interpixel region
220 backlight unit
230 light emitting diodes
240 diffuser
250 linear array
260 waveguide
270 planar array
280 cold cathode fluorescent lamp
300 rows
305 polarizer layer
310 light shutter layer
315 red/green dielectric stack
320 beam expander
330 liquid crystal cell
340 analyzer
350 liquid crystal substrates
360 transparent conductor layer
370 alignment layer
380 liquid crystal material
φ azimuthal angle
θ tilt angle

The invention claimed is:

1. A display apparatus for producing colored pixelated light, comprising:
   a) a backlight unit for producing pump-beam light;
   b) a vertical cavity laser array device including:
      i) a structure for modulating the properties of the device at spaced locations so as to provide an array of spaced laser pixels which have higher net gain than the interpixel regions; and
      ii) an active region which produces blue light in response to the pump-beam light;
   c) a light shutter; and
   d) a color conversion layer including different portions where selected different portions in response to blue light produce a different colored light and being adapted to increase the angular cone of view of the selected colored light.

2. The display apparatus of claim 1 wherein a polarizing layer is provided between the vertical cavity laser array device and the light shutter.

3. The display apparatus of claim 1 wherein the vertical cavity laser array device further includes a birefringent layer disposed in the laser array device to ensure that the device produces polarized light having a predetermined polarization direction.

4. A display apparatus for producing colored pixelated light, comprising:
   a) a backlight unit for producing pump-beam light;
   b) a vertical cavity laser array device having:
      i) a transparent substrate;
      ii) a bottom dielectric stack reflective to light over a predetermined range of wavelengths and being disposed over the substrate;
      iii) means for modulating the properties of the device at spaced locations so as to provide an array of spaced laser pixels which have higher net gain than the interpixel regions;
      iv) an active region which produces blue light in response to the pump-beam light; and
      v) a top dielectric stack spaced from the bottom dielectric stack and reflective to light over a predetermined range of wavelengths;
   c) a light shutter for permitting selected blue light from the vertical cavity laser array device to pass therethrough;
   d) a third dielectric stack disposed on top of the light shutter for reflecting red and green light from the color conversion layer; and
   e) a color conversion layer including different portions disposed over the third dielectric stack, where selected different portions in response to blue light produce a different colored light and being adapted to increase the angular cone of view of the selected colored light.

5. The display apparatus of claim 4 wherein a polarizing layer is provided between the vertical cavity laser array device and the light shutter.

6. The display apparatus of claim 4 wherein the vertical cavity laser array device further includes a birefringent layer disposed in the laser array device to ensure that the device produces polarized light having a predetermined polarization direction.

7. The display apparatus of claim 4 wherein the light shutter includes at least one layer having liquid crystals which are responsive to an applied field for permitting selected light to pass through and means for applying the field to selected portions of the liquid crystal layer.

8. The display apparatus of claim 4 wherein the light shutter includes at least one layer of polarizing film.

9. The display apparatus of claim 4 wherein the light shutter includes at least one layer having electrowetting switches.

10. The display apparatus of claim 4 wherein the backlight unit includes light emitting diodes or cold cathode fluorescent lamps.

11. The display apparatus of claim 4 wherein the active region includes one or more periodic gain region(s) and spacer layers disposed on either side of the periodic gain region(s) and arranged so that the periodic gain region(s) is aligned with the antinodes of the device's standing wave electromagnetic field.

12. The display apparatus of claim 11 wherein the periodic gain region(s) includes an organic host material and a dopant, and the spacer layers are substantially transparent to pump-beam light and laser light.

13. The display apparatus of claim 11 wherein the spacer layers include 1,1-Bis-(4-bis(4-methyl-phenyl)-amino-phenyl)-cyclohexane or silicon dioxide.

14. The display apparatus of claim 11 wherein the periodic gain region(s) includes the host material of 2-tert-butyl-9,10-di-naphthalen-2-yl-anthracene and the dopant of 2,5,8,11-tetrakis(1,1-dimethylethyl)-perylene.

15. The display apparatus of claim 11 wherein the periodic gain region(s) includes polymeric materials.

16. The display apparatus of claim 11 wherein the periodic gain region(s) includes inorganic nanoparticles.

17. The display apparatus of claim 4 wherein the spaced laser pixels have the same or different sizes and the spacings between pixels have the same or different lengths to cause the output of the vertical cavity laser array device to produce single or multimode laser output.

18. The display apparatus of claim 4 wherein the spacing between pixels is in the range of 0.25 to 4 microns.

19. The display apparatus of claim 4 wherein the size of the pixels is in the range of 2.5 to 20 microns.

20. The display apparatus of claim 4 wherein the pixels are arranged in a periodic two-dimensional array.

21. The display apparatus of claim 4 wherein the pixels are arranged randomly in a two-dimensional array.

22. The display apparatus of claim 4 wherein the array of spaced laser pixels includes a plurality of spaced apart absorbing elements selected to absorb the pump beam light.

23. The display apparatus of claim 4 wherein the array of spaced laser pixels includes altering the emissive properties of the active region at spaced apart locations.

24. The display apparatus of claim 23 wherein the emissive properties are altered by high intensity UV radiation.

25. The display apparatus of claim 4 wherein the array of spaced laser pixels includes selectively forming an etched region in the top surface of the bottom dielectric stack.

26. The display apparatus of claim 25 wherein a planarization layer is formed over the selectively etched bottom dielectric stack.

27. The display apparatus of claim 26 wherein the planarization layer includes polyimide or $SiO_2$ and is thinned by a chemical mechanical polishing system.

28. The display apparatus of claim 26 wherein the planarization layer includes polymethyl-methacrylate.

29. The display apparatus of claim 6 wherein the birefringent layer is disposed between the active region and either the bottom or top dielectric layers.

30. The display apparatus of claim 6 wherein the birefringent layer is disposed within one of the dielectric stacks.

31. The display apparatus of claim 6 wherein the birefringent layer includes an alignment layer disposed on at least one of the two sides of the birefringent layer.

32. The display apparatus of claim 31 wherein the alignment layer includes a material which permits orientation by a photo-alignment method.

33. The display apparatus of claim 31 wherein the alignment layer includes a material which permits orientation by mechanical rubbing.

34. The display apparatus of claim 6 wherein the birefringent layer includes a positive or negative birefringent material, whose optic axis has an average tilt angle between 0° and 20°.

35. The display apparatus of claim 34 wherein the birefringent material includes polymeric liquid crystals.

36. The display apparatus of claim 4 wherein the pump-beam light is transmitted and introduced into the active region through at least one of the dielectric stacks.

37. A display apparatus for producing colored pixelated light comprising:
   a) a backlight unit for producing pump-beam light;
   b) a vertical cavity laser array device including:
      i) an etched region formed selectively in the top surface of the first portion of the bottom dielectric stack to provide an array of spaced laser pixels which have higher net gain than the interpixel regions; and
      ii) an active region which produces blue light in response to the pump-beam light;
   c) a light shutter; and
   d) a color conversion layer including different portions, where selected different portions in response to blue light produce a different colored light and being adapted to increase the angular cone of view of the selected colored light.

38. The display apparatus of claim 37 wherein a polarizing layer is provided between the vertical cavity laser array device and the light shutter.

39. The display apparatus of claim 37 wherein the vertical cavity laser array device further includes a birefringent layer disposed in the laser array device to ensure that the device produces polarized light having a predetermined polarization direction.

40. A display apparatus for producing colored pixelated light, comprising:
   a) a backlight unit for producing pump-beam light;
   b) a vertical cavity laser array device having:
      i) a transparent substrate;
      ii) a first portion of the bottom dielectric stack reflective to light over a predetermined range of wavelengths and being disposed over the substrate;
      iii) an etched region formed selectively in the top surface of the first portion of the bottom dielectric stack to provide an array of spaced laser pixels which have higher net gain than the interpixel regions;
      iv) a second portion of the bottom dielectric stack formed over the etched first portion;
      v) an active region which produces blue light in response to the pump-beam light; and
      vi) a top dielectric stack spaced from the bottom dielectric stack and reflective to light over a predetermined range of wavelengths;
   c) a light shutter for permitting selected blue light from the vertical cavity laser array device to pass therethrough;
   d) a third dielectric stack disposed on top of the light shutter for reflecting red and green light from the color conversion layer; and
   e) a color conversion layer including different portions disposed over the third dielectric stack, where selected different portions in response to blue light produce a different colored light and being adapted to increase the angular cone of view of the selected colored light.

41. The display apparatus of claim 40 wherein a polarizing layer is provided between the vertical cavity laser array device and the light shutter.

42. The display apparatus of claim 40 wherein the vertical cavity laser array device further includes a birefringent layer disposed in the laser array device to ensure that the device produces polarized light having a predetermined polarization direction.

43. The display apparatus of claim 40 wherein the light shutter includes at least one layer having liquid crystals which are responsive to an applied field for permitting selected light to pass through and means for applying the field to selected portions of the liquid crystal layer.

44. The display apparatus of claim 40 wherein the light shutter includes at least one layer of polarizing film.

45. The display apparatus of claim 40 wherein the light shutter includes at least one layer having electrowetting switches.

46. The display apparatus of claim 40 wherein the backlight unit includes light emitting diodes or cold cathode fluorescent lamps.

47. The display apparatus of claim 40 wherein the active region includes one or more periodic gain region(s) and spacer layers disposed on either side of the periodic gain region(s) and arranged so that the periodic gain region(s) is aligned with the antinodes of the device's standing wave electromagnetic field.

48. The display apparatus of claim 47 wherein the periodic gain region(s) includes an organic host material and a dopant and the spacer layers are substantially transparent to pump-beam light and laser light.

49. The display apparatus of claim 47 wherein the spacer layers include 1,1-Bis-(4-bis(4-methyl-phenyl)-amino-phenyl)-cyclohexane or silicon dioxide.

50. The display apparatus of claim 47 wherein the periodic gain region(s) includes the host material of 2-tert-butyl-9,10-di-naphthalen-2-yl-anthracene and the dopant of 2,5,8,11-tetrakis(1,1-dimethylethyl)-perylene.

51. The display apparatus of claim 47 wherein the periodic gain region(s) includes polymeric materials.

52. The display apparatus of claim 47 wherein the periodic gain region(s) includes inorganic nanoparticle.

53. The display apparatus of claim 40 wherein the spaced laser pixels have the same or different sizes and the spacings between pixels have the same or different lengths to cause the output of the vertical cavity laser array device to produce single or multimode laser output.

54. The display apparatus of claim 40 wherein the spacing between pixels is in the range of 0.25 to 4 microns.

55. The display apparatus of claim 40 wherein the size of the pixels is in the range of 2.5 to 20 microns.

56. The display apparatus of claim 40 wherein the pixels are arranged in a periodic two-dimensional array.

57. The display apparatus of claim 40 wherein the pixels are arranged randomly in a two-dimensional array.

58. The display apparatus of claim 40 wherein a planarization layer is formed between the first and second portions of the bottom dielectric stack.

59. The display apparatus of claim 58 wherein the planarization layer includes polyimide or $SiO_2$ and is thinned by a chemical mechanical polishing system.

60. The display apparatus of claim 58 wherein the planarization layer includes polymethyl-methacrylate.

61. The display apparatus of claim 42 wherein the birefringent layer is disposed between the active region and either the bottom or top dielectric layers.

62. The display apparatus of claim 42 wherein the birefringent layer is disposed within one of the dielectric stacks.

63. The display apparatus of claim 42 wherein the birefringent layer includes an alignment layer disposed on at least one of its two sides.

64. The display apparatus of claim 63 wherein the alignment layer includes a material suitable to permit orientation by a photo-alignment method.

65. The display apparatus of claim 63 wherein the alignment layer includes a material suitable to permit orientation by mechanical rubbing.

66. The display apparatus of claim 42 wherein the birefringent layer includes a positive or negative birefringent material, whose optic axis has an average tilt angle between 0° and 20°.

67. The display apparatus of claim 66 wherein the birefringent material includes polymeric liquid crystals.

68. The display apparatus of claim 40 wherein the pump-beam light is transmitted and introduced into the active region through at least one of the dielectric stacks.

* * * * *